US012212078B2

(12) United States Patent
Michaelis et al.

(10) Patent No.: US 12,212,078 B2
(45) **Date of Patent: *Jan. 28, 2025**

(54) MULTI-BAND MULTI-BEAM LENSED ANTENNAS SUITABLE FOR USE IN CELLULAR AND OTHER COMMUNICATIONS SYSTEMS

(71) Applicant: Outdoor Wireless Networks LLC, Claremont, NC (US)

(72) Inventors: Scott Michaelis, Plano, TX (US); Igor Timofeev, Dallas, TX (US); Edward Bradley, Allen, TX (US)

(73) Assignee: Outdoor Wireless Networks LLC, Claremont, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,743

(22) Filed: Feb. 6, 2024

(65) Prior Publication Data

US 2024/0178563 A1 May 30, 2024

Related U.S. Application Data

(63) Continuation of application No. 16/320,201, filed as application No. PCT/US2017/045016 on Aug. 2, 2017, now Pat. No. 12,034,227.

(Continued)

(51) Int. Cl.
*H01Q 1/24* (2006.01)
*H01Q 1/42* (2006.01)
(Continued)

(52) U.S. Cl.
CPC ............... *H01Q 5/42* (2015.01); *H01Q 1/246* (2013.01); *H01Q 1/42* (2013.01); *H01Q 5/48* (2015.01);
(Continued)

(58) Field of Classification Search
CPC ............ H01Q 1/246; H01Q 1/24; H01Q 1/42; H01Q 15/00; H01Q 15/0013;
(Continued)

(56) References Cited

U.S. PATENT DOCUMENTS 3,119,109 A 1/1964 Miller et al.
5,589,983 A 12/1996 Meyers et al.
(Continued)

FOREIGN PATENT DOCUMENTS

CN 1836352 A 9/2006
CN 103503231 A 1/2014
(Continued)

OTHER PUBLICATIONS

Examples of 2-band Multi-Beam Antennas (Admitted Prior Art), date unknown, 1 p.

(Continued)

*Primary Examiner* — Tho G Phan
(74) *Attorney, Agent, or Firm* — Myers Bigel, P.A.

(57) ABSTRACT

Multi-band phased array antennas include a backplane, a vertical array of low-band radiating elements that form a first antenna beam, first and second vertical arrays of high-band radiating elements that form respective second and third antenna beams and a vertical array of RF lenses. The first, second and third antenna beams point in different directions. A respective one of the second radiating elements and a respective one of the third radiating elements are positioned between the backplane and each RF lens, and at least some of the first radiating elements are positioned between the RF lenses.

9 Claims, 12 Drawing Sheets

Related U.S. Application Data

(60) Provisional application No. 62/384,280, filed on Sep. 7, 2016.

(51) Int. Cl.

| | |
|---|---|
| ***H01Q 5/42*** | (2015.01) |
| ***H01Q 5/48*** | (2015.01) |
| ***H01Q 15/02*** | (2006.01) |
| ***H01Q 15/08*** | (2006.01) |
| ***H01Q 15/14*** | (2006.01) |
| ***H01Q 19/06*** | (2006.01) |
| ***H01Q 21/10*** | (2006.01) |
| ***H01Q 21/26*** | (2006.01) |

(52) U.S. Cl.
CPC ............. *H01Q 15/02* (2013.01); *H01Q 15/08* (2013.01); *H01Q 15/14* (2013.01); *H01Q 19/06* (2013.01); *H01Q 19/062* (2013.01); *H01Q 21/10* (2013.01); *H01Q 21/26* (2013.01)

(58) Field of Classification Search
CPC ...... H01Q 15/006; H01Q 15/02; H01Q 15/08; H01Q 15/14; H01Q 19/06; H01Q 19/062; H01Q 21/10; H01Q 21/26; H01Q 5/42; H01Q 5/48; H01Q 1/12; H01Q 3/34
See application file for complete search history.

(56) References Cited

U.S. PATENT DOCUMENTS

| | | | | |
|---|---|---|---|---|
| 6,081,235 | A | 6/2000 | Romanofsky et al. | |
| 7,623,088 | B2 | 11/2009 | Brown | |
| 7,642,988 | B1 | 1/2010 | Johnson et al. | |
| 8,237,619 | B2 | 8/2012 | Vassilakis et al. | |
| 9,077,070 | B2 | 7/2015 | Zimmerman et al. | |
| 9,705,201 | B2 * | 7/2017 | White | H05K 1/165 |
| 9,819,094 | B2 | 11/2017 | Matitsine et al. | |
| 10,069,213 | B2 | 9/2018 | Song et al. | |
| 10,461,414 | B2 * | 10/2019 | Deng | H01Q 25/001 |
| 10,483,650 | B1 | 11/2019 | Zimmerman et al. | |
| 10,770,790 | B1 | 9/2020 | Mahanfar | |
| 11,019,506 | B2 | 5/2021 | Wu et al. | |
| 11,069,959 | B1 * | 7/2021 | Kaistha | H01Q 21/062 |
| 11,196,168 | B2 * | 12/2021 | Wu | H01Q 1/246 |
| 11,283,186 | B2 | 3/2022 | Galla et al. | |
| 11,699,842 | B2 * | 7/2023 | Bisiules | H01Q 1/246 343/817 |
| 12,034,227 | B2 * | 7/2024 | Michaelis | H01Q 19/06 |
| 2008/0291098 | A1 | 11/2008 | Kish et al. | |
| 2010/0134374 | A1 | 6/2010 | Skalina et al. | |
| 2011/0205119 | A1 | 8/2011 | Timofeev et al. | |
| 2014/0111396 | A1 | 4/2014 | Hyjazie et al. | |
| 2014/0375502 | A1 | 12/2014 | Foo | |
| 2015/0091767 | A1 | 4/2015 | Matitsine et al. | |
| 2017/0062944 | A1 | 3/2017 | Zimmerman et al. | |
| 2017/0125917 | A1 | 5/2017 | Lin et al. | |

FOREIGN PATENT DOCUMENTS

| | | | |
|---|---|---|---|
| CN | 104900998 | A | 9/2015 |
| CN | 105659434 | A | 6/2016 |
| CN | 108767449 | A | 11/2018 |
| CN | 110233335 | A | 9/2019 |
| CN | 112054300 | A | 12/2020 |
| CN | 112072283 | A | 12/2020 |
| JP | 2006054730 | A | 2/2006 |
| WO | 0201808 | A2 | 1/2002 |
| WO | 2016081515 | A1 | 5/2016 |

OTHER PUBLICATIONS

Extended European Search Report corresponding to EP 17849251.8; dated Mar. 25, 2020 (25 pages).
International Search Report and Written Opinion of the International Searching Authority, International Application No. PCT/US2017/045016, Oct. 12, 2017, 11 pp.
Li , et al., "AMC-Loaded Wideband Base Station Antenna for Indoor Access Point in MIMO System", IEEE Transactions on Antennas and Propagation, vol. 63, No. 2, Feb. 2015, pp. 525-533.

* cited by examiner

MULTI-BAND MULTI-BEAM LENSED ANTENNAS SUITABLE FOR USE IN CELLULAR AND OTHER COMMUNICATIONS SYSTEMS

CROSS-REFERENCE TO RELATED APPLICATIONS

The present application is a continuation application that claims priority under 35 U.S.C. § 120 to U.S. patent application Ser. No. 16/320,201, filed Jan. 24, 2019, which in turn is a 35 U.S.C. § 371 national stage application of PCT Application No. PCT/US2017/045016, filed on Aug. 2, 2017, which itself claims priority under 35 U.S.C. § 119 to U.S. Provisional Patent Application Ser. No. 62/384,280, filed Sep. 7, 2016, the entire contents of each of which is incorporated herein by reference as if set forth in its entirety.

FIELD

The present invention generally relates to radio communications and, more particularly, to lensed antennas that are suitable for use in cellular and various other types of communications systems.

BACKGROUND

Cellular communications systems are well known in the art. In a typical cellular communications system, a geographic area is divided into a series of regions that are referred to as "cells," and each cell is served by a base station. The base station may include baseband equipment, radios and antennas that are configured to provide two-way radio frequency ("RF") communications with mobile subscribers that are geographically positioned within the cell. In many cases, the cell may be divided into a plurality of "sectors," and separate antennas are provided for each of the sectors. These antennas are often mounted on a tower or other raised structure, with the radiation beam ("antenna beam") that is generated by each antenna directed outwardly to serve the respective sector. Typically, a base station antenna is implemented as a phase-controlled array of radiating elements, with the radiating elements arranged in one or more vertical columns. Herein, "vertical" refers to a direction that is perpendicular relative to the plane defined by the horizon.

A common cellular communications system network plan involves a base station serving a cell using three base station antennas. This is often referred to as a three-sector configuration. In a three-sector configuration, each base station antenna serves a 120 degree sector of the cell. Typically, a 65 degree azimuth Half Power Beamwidth (HPBW) antenna provides coverage for a 120 degree sector. Three of these antennas provide 360 degree coverage. Other sectorization schemes may also be employed. For example, six, nine, and twelve sector configurations are also used. Six sector sites may use six base station antennas, each having a 33 degree azimuth HPBW antenna serving a 60 degree sector. In other proposed solutions, a multi-column phased array antenna (i.e., an antenna with multiple columns of radiating elements) may be driven by a feed network to produce two or more antenna beams from a single phased array antenna. Each beam may provide coverage to a sector. For example, if multi-column phased array antennas are used that each generate two 33 degrees azimuth HPBW beams, then only three antennas may be required for a six sector configuration. Antennas that generate multiple beams are disclosed, for example, in U.S. Patent Publication No. 2011/0205119 and U.S. Patent Publication No. 2015/0091767, the entire content of each of which is incorporated herein by reference.

Increasing the number of sectors increases system capacity because each antenna can service a smaller area and therefore provide higher antenna gain throughout the sector and/or allow for frequency reuse. However, dividing a cell into smaller sectors has drawbacks because antennas covering narrow sectors typically have more radiating elements that are spaced wider apart than are the radiating elements of antennas covering wider sectors. For example, a typical 33 degree azimuth HPBW antenna is generally twice as wide as a typical 65 degree azimuth HPBW antenna. Thus, cost, space and tower loading requirements may increase as a cell is divided into a greater number of sectors.

Another complication is that as demand has grown for cellular systems to support increased capacity and provide enhanced capabilities, a variety of new cellular services have been introduced. The new services that are added typically operate in different frequency bands from existing services to avoid interference. When these new services are introduced, the existing "legacy" services typically must be maintained to support legacy mobile devices for years or even decades. Thus, as new services are introduced, either new cellular base stations must be deployed or existing cellular base stations must be upgraded to support the new services. In order to reduce cost, base station antennas are now available that include at least two different arrays of radiating elements, where each array of radiating elements supports a different type of cellular service. Supporting multiple cellular services, however, may further increase the complexity of a typical cellular base station antenna.

SUMMARY

Pursuant to embodiments of the present invention, multi-band phased array antennas are provided that include a backplane and first, second and third arrays of respective first, second and third radiating elements that are mounted in front of a front surface of the backplane. The first radiating elements are disposed in a first vertically-disposed column and configured to form a first antenna beam that points in a first direction, the second radiating elements are disposed in a second vertically-disposed column and configured to form a second antenna beam that points in a second direction that is different than the first direction, and the third radiating elements are disposed in a third vertically-disposed column and configured to form a third antenna beam that points in a third direction that is different than the first direction and the second direction. The antenna further includes a plurality of radio frequency ("RF") lens that are in a vertically-disposed column in front of the front surface of the backplane. A respective one of the second radiating elements and a respective one of the third radiating elements are positioned between the backplane and each RF lens. At least some of the first radiating elements are positioned between the RF lenses.

In some embodiments, the first radiating elements may be low-band radiating elements that are configured to operate in a first frequency band and the second and third radiating elements may be high-band radiating elements that are configured to operate in a second frequency band that is at higher frequencies than the first frequency band.

In some embodiments, each first radiating element may comprise a pair of tri-pol radiators.

In some embodiments, each first radiating element may comprise three tri-pol radiators that are arranged in a triangle. In such embodiments, a first of the RF lenses may be disposed within the triangle defined by the three tri-pol radiators of one of the first radiating elements.

In some embodiments, each first radiating element may comprise a crossed-dipole radiating element.

In some embodiments, the first vertically-disposed column may be between the second and third vertically-disposed columns.

In some embodiments, the phased array antenna may further include a fourth array of fourth radiating elements that is mounted in front of the front surface of the backplane, the fourth radiating elements disposed in a fourth vertically-disposed column and configured to form a fourth antenna beam that points in a fourth direction. The fourth direction may be substantially the same as the first direction in some embodiments.

In some embodiments, a half-power azimuth beamwidth of the first array of first radiating elements may be substantially the same as the half-power azimuth beamwidth of the combination of the second array of second radiating elements, the third array of third radiating elements and the fourth array of fourth radiating elements.

In some embodiments, each RF lens may be a spherical RF lens.

In some embodiments, each RF lens may be an elliptical RF lens.

In some embodiments, at least some of the RF lenses may include a frequency selective structure that is configured to substantially reflect RF energy in the first frequency band and to substantially pass RF energy in the second frequency band.

In some embodiments, a half-power azimuth beamwidth of the first array of first radiating elements may be substantially the same as the half-power azimuth beamwidth of the combination of the second array of second radiating elements and the third array of third radiating elements.

In some embodiments, the RF lenses may each include a dielectric material that comprises expandable microspheres mixed with pieces of conductive sheet material that have an insulating material on each major surface.

In some embodiments, the RF lenses may each include a dielectric material that comprises small pieces of a foamed dielectric material that have at least one sheet of conductive material embedded therein.

Pursuant to further embodiments of the present invention, multi-band phased array antennas are provided that include a backplane, a first vertically-disposed column of low-band radiating elements mounted in front of the backplane that are configured to form a first antenna beam that points in a first direction, a second vertically-disposed column of high-band radiating elements mounted in front of the backplane that are configured to form a second antenna beam that points in a second direction that is different than the first direction, a third vertically-disposed column of high-band radiating elements mounted in front of the backplane that are configured to form a third antenna beam that points in a third direction that is different than the first direction and the second direction and at least one radio frequency ("RF") lens that is disposed in front of the first vertically-disposed column of low-band radiating elements, the second vertically-disposed column of high-band radiating elements and the third vertically-disposed column of high-band radiating elements. A respective artificial magnetic conductor is disposed between a radiator of each of the low-band radiating elements and the backplane.

In some embodiments, the phased array antenna may further include a first secondary RF lens that may be between at least one of the high-band radiating elements in the second vertically-disposed column and the at least one RF lens and a second secondary RF lens that may be between at least one of the high-band radiating elements in the third vertically-disposed column and the at least one RF lens.

In some embodiments, the at least one RF lens may be a cylindrical RF lens.

In some embodiments, the at least one RF lens may be a column of spherical RF lens.

In some embodiments, the at least one RF lens may be a column of elliptical RF lens.

In some embodiments, the at least one RF lens may be a pair of cylindrical RF lens.

In some embodiments, a half-power azimuth beamwidth of the first antenna beam may be substantially the same as the half-power azimuth beamwidth of the combination of the second and third antenna beams.

In some embodiments, the phased array antenna may further include a fourth vertically-disposed column of high-band radiating elements mounted in front of the backplane that are configured to form a fourth antenna beam. The fourth antenna beam may point in substantially the same direction as the first direction.

In some embodiments, a half-power azimuth beamwidth of the first antenna beam may be substantially the same as the half-power azimuth beamwidth of the combination of the second, third and fourth antenna beams.

In some embodiments, the at least one RF lens may include a dielectric material that comprises expandable microspheres mixed with pieces of conductive sheet material that have an insulating material on each major surface.

In some embodiments, the at least one RF lens may include a dielectric material that comprises small pieces of a foamed dielectric material that have at least one sheet of conductive material embedded therein.

DETAILED DESCRIPTION

Figure 1:
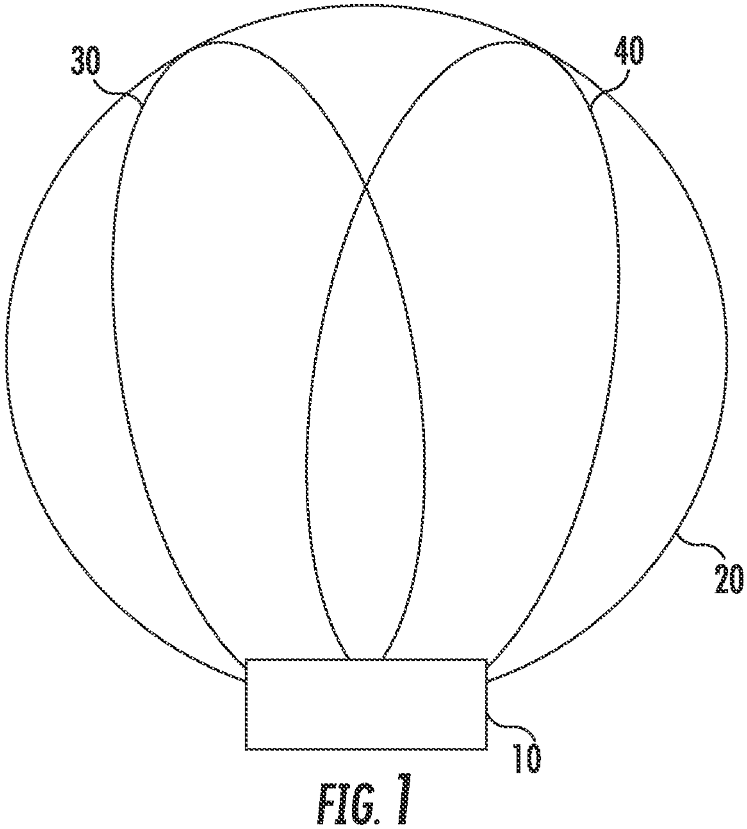
FIG. 1 is a schematic top view of the antenna patterns generated by base station antennas according to certain embodiments of the present invention.

Many state-of-the-art base station antennas now include multiple vertical columns of radiating elements in order to support multiple different types of cellular service. A very common base station antenna configuration includes a first linear array of radiating elements that transmits and receives signals in a first frequency band (the "low-band") and one or more linear arrays of radiating elements that transmit and receive signals in a second frequency band (the "high-band") that is at higher frequencies than the first frequency band. Such an antenna is referred to as a "dual-band" antenna as it supports service in two different frequency bands using two different sets of radiating elements. Typically, the low-band includes one or more specific frequency bands that are below about 1 GHz, and the high-band includes one or more specific frequency bands that are above 1 GHz (and typically above 1.6 GHZ), although other definitions of the low-band and high-band may be used. The specific frequency bands may correspond to specific types of cellular service such as, for example, Global System for Mobile Communications ("GSM") service, Universal Mobile Telecommunications system ("UTMS") service, Long Term Evolution ("LTE") service, CDMA service, etc.

It will be appreciated that the low-band radiating elements may be "wide-band" radiating elements that support multiple different types of cellular service that are within the low-band frequency range. Likewise, the high-band radiating elements may be "wide-band" radiating elements that support multiple different types of cellular service that are within the high-band frequency range. Thus, a dual-band antenna may support more than two different types of cellular service by using such wide-band radiating elements and using diplexers to split the signals in the two different cellular services that are received by the wide-band radiating elements and to combine the signals in the two different cellular services that are fed to the wide-band radiating elements. It will likewise be appreciated that while the present disclosure focuses primarily on dual-band antennas that support service in two different frequency bands using two different sets of radiating elements, the techniques disclosed herein may be applied to any multi-band antenna including, for example, tri-band antennas.

To increase communication capacity, operators often use a split-sector technique by employing multi-beam antennas that generate more than one antenna beam within a given frequency band. For example, multi-band, multi-beam base station antennas are known that include a first linear array of low-band radiating elements and second and third linear arrays of high-band radiating elements. In these antennas, the radiating elements in the low-band array may be designed to have a HPBW beamwidth in the azimuth direction of about 65 degrees, and hence a base station having three of these antennas may provide full 360 degree coverage for the low-band. The second and third linear arrays of high-band radiating elements may be fed by a feed network that includes a Butler matrix to produce a pair of adjacent antenna beams in the high-band that have a HPBW beamwidth in the azimuth direction of about 33 degrees. Thus, a base station having three such antennas may also provide full 360 degree coverage for the high band using six high band antenna beams that each have a HPBW beamwidth in the azimuth direction of about 33 degrees.

Most typically, wireless operators require more high-band antenna beams than low-band antenna beams. Since this case is most common, the example embodiments of the present invention discussed herein have more high-band arrays than low-band arrays. In multi-band, multi-beam base station antenna applications, currently a single low-band array coupled with two or more high-band arrays is perhaps the most commonly used antenna design, although other designs are used. In specialty applications, such as antennas for large venues, a greater number of low-band and high-band antenna beams may be provided.

Several different methods are currently used to generate multiple beams within the same band for purposes of sector splitting. As noted above, in one approach, a Butler matrix is used to generate multiple antenna beams. Unfortunately, the Butler matrix approach has several potential disadvantages, including relatively narrow bandwidth, less symmetrical antenna beams, degraded sidelobe suppression, high cost and the like. Another potential method of sector splitting is to include an RF lens on a base station antenna that includes multiple linear arrays. For example, a base station antenna may have multiple high-band linear arrays that point in different directions to provide multiple adjacent high-band antenna beams, and the RF lens may be used to narrow each of these high-band antenna beams to, for example, a suitable azimuth beam width.

As an example, cylindrical RF lenses have been combined with vertical linear arrays in base station antenna applications. One such antenna is disclosed in U.S. Patent Publication No. 2015/0070230, the entire content of which is incorporated herein by reference. In base station antennas that include a cylindrical RF lens, the longitudinal axis of the lens is oriented to be approximately parallel to the longitudinal axes of the linear arrays (i.e., both the lens and the linear arrays extend vertically with respect to the plane defined by the horizon). The characteristics of the linear arrays define the elevation beamwidth of the resulting beam patterns (i.e., the cylindrical lens does not generally modify the elevation beamwidth). Thus, the number of radiating elements in each linear array and the spacing between these radiating elements, along with the design of the radiating elements and the frequency of operation, may be primary factors affecting the elevation beamwidth of the linear array. The cylindrical RF lens, however, acts to narrow the beamwidth of the azimuth pattern of each linear array. In one example provided in the above-referenced U.S. Patent Publication No. 2015/0070230, a cylindrical RF lens is used to narrow the azimuth HPBW of a vertical linear array from about 65 degrees to about 33 degrees. Thus, an advantage of a linear array with a cylindrical lens is that it may achieve the performance (in terms of antenna beam narrowing in the azimuth plane) of a multi-column phased array antenna with only a single column of radiating elements. In the above-referenced U.S. Patent Publication No. 2015/0070230, two linear arrays that point in different directions are positioned behind the cylindrical RF lens to form a pair of adjacent antenna beams that each have an azimuth HPBW of about 33 degrees.

While generally beneficial, cylindrical RF lenses may exhibit certain disadvantages. For example, in some cases, cylindrical RF lenses may generate cross-polarization distortion. As known to those of skill in the art, cross-polarization distortion refers to the amount of energy that is emitted by a cross-polarized antenna having elements designed to emit energy at a first polarization (e.g., a horizontal polarization) that is emitted at an orthogonal polarization (e.g., a vertical polarization). Cylindrical RF lenses also have a relatively high volume which may increase the size, weight and cost of the antenna, particularly as the materials used to form the lens may be expensive. Additionally, as discussed above, cylindrical lenses do not narrow the elevation beamwidth, and hence the length of the linear array may be the primary factor used to reduce the elevation beamwidth. As the radiating elements in a linear array often cannot be spaced apart by more than about 0.6-0.9 wavelengths of the RF signals that are transmitted and received therethrough without creating significant grating lobes, the increased length requirement for reducing the elevation beamwidth results in a corresponding increase in the number of radiating elements included in the linear array. The use of a cylindrical RF lens does not address this issue.

Typically, corporate feed networks are used with the above-described phased array base station antennas. In order to reduce costs, these corporate feed networks often have a 1:4 or 1:5 geometry (meaning the feed network has a single input and 4 or 5 outputs for RF signals travelling in the transmit direction). As the linear arrays typically have 8-15 radiating elements, the radiating elements are grouped into sub-arrays of radiating elements, where each sub-array is fed by a single output of the corporate feed network (and hence each radiating element that is included in a particular sub-array receives the same signal having a like phase and amplitude). For example, a 1:5 corporate feed network may be coupled to five sub-arrays, where each sub-array comprises one to three radiating elements. Increasing the number of radiating elements and/or sub-array assemblies adds to the cost and complexity of the antenna. Additionally, if element spacing is increased to approach one wavelength, to widen the aperture and narrow the elevation beamwidth while using a smaller number of radiating elements, grating lobes begin to appear as the radiation beam is electronically steered off of mechanical boresight, as would be the case when remote electronic tilt is used to electronically downtilt the elevation pattern of the antenna. Thus, it may be difficult to achieve a high performance base station antenna while simultaneously reducing the size and cost of the antenna when using a cylindrical RF lens.

Pursuant to embodiments of the present invention, compact base station antennas are provided that may support both low-band and high-band service, with the antenna forming one antenna beam that supports the low-band service and two or more antenna beams that support the high-band service. These antennas may have approximately the same azimuth beamwidth for the low-band and high-band service, where the azimuth beamwidth for the high-band service is the azimuth beamwidth of the combination of the two or more high-band antenna beams. The low-band and high-band antenna beams may have the same or different elevation beamwidths. Both the low-band and high-bands may exhibit ultra-wideband performance and hence the base station antenna may be used to support multiple different types of low-band service and multiple different types of high-band service.

The base station and other antennas according to embodiments of the present invention may be formed using one or more RF lenses that are used to narrow the beamwidths of the arrays of high-band radiating elements. In some embodiments, a single cylindrical RF lens may be provided that operates in conjunction with two or more vertical arrays of high-band radiating elements and one or more vertical arrays of low band radiating elements. In other embodiments, multiple cylindrical RF lenses may be used. In still other embodiments, linear arrays of spherical or elliptical RF lenses may be used.

The antennas may be designed in some embodiments so that the RF lenses have little effect on the low-band signals. For example, in some embodiments, the low-band radiating elements may be positioned between the RF lenses and a backplane of the antenna, and the RF lenses may be designed to be substantially transparent to the low-band radiating elements. In other embodiments, the low-band radiating elements may be positioned between as opposed to behind the RF lenses to reduce the impact that the RF lenses have on the low-band signals. In some embodiments, artificial magnetic conductor ("AMC") materials may be used to allow the low band radiating elements to be placed closer to the backplane to increase the compactness of the antenna. The low-band and high-band radiating elements may comprise ultra-wideband radiating elements in some embodiments.

Embodiments of the present invention will now be discussed in further detail with reference to the figures, in which example embodiments of the invention are shown.

FIG. 1 is a schematic top view illustrating the antenna beams formed by a dual-band base station antenna 10 according to embodiments of the present invention. As shown in FIG. 1, the base station antenna 10 generates one low-band antenna beam 20, and two high-band antenna beams 30, 40. In some embodiments, the low-band antenna beam 20 may have a half-power azimuth beamwidth of about 65 degrees, and the combination of the two high-band antenna beams 30, 40 may together have a half-power azimuth beamwidth of about 65 degrees. Thus, three base station antennas 10 may provide full 360 degree coverage for both the low-band and the high-band.

Figure 2:
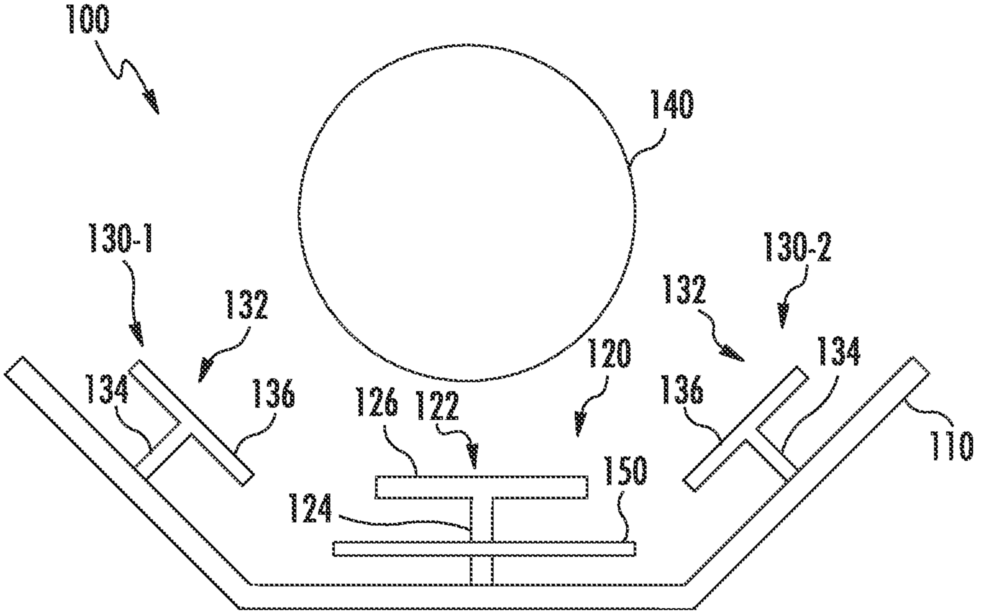
FIG. 2 is a schematic top view of a base station antenna according to certain embodiments of the present invention.

FIG. 2 is a schematic top view of a base station antenna 100 that may be used to generate the antenna beams 20, 30, 40 that are illustrated in FIG. 1. As shown in FIG. 2, the base station antenna 100 includes three vertically-oriented linear arrays of radiating elements, namely a low-band array 120 that includes a plurality of low-band radiating elements 122 and first and second high-band arrays 130-1, 130-2 that each include a plurality of high-band radiating elements 132. Herein, when multiple like elements are provided, they may be numbered with a two-part reference numeral and may be referred to individually by the full reference numeral (e.g., the high-band array 130-2) and collectively by the first part of the reference numeral (e.g., the high-band arrays 130). As FIG. 2 is a top schematic view, only the uppermost radiating element 122, 132 in each linear array 120, 130 is visible in FIG. 2, but it will be appreciated that a plurality of radiating elements 122, 132 are provided in the respective linear arrays 120, 130, where often between about 8 and 15 radiating elements 122, 132 are provided per linear array 120, 130. A cylindrical RF lens 140 is mounted in front of the radiating elements 122, 132. A longitudinal axis of the cylindrical lens 140 may extend in the vertical direction. The radiating elements 122, 132 are mounted on a backplane 110. The backplane 110 may comprise a unitary structure or may comprise a plurality of structures that are attached together. The backplane 110 may comprise, for example, a reflector that serves as a ground plane for the radiating elements 122, 132. The backplane 110 may be non-planar as shown.

Each low-band radiating element 122 may comprise a stalk 124 and a radiator 126. The radiator 126 may comprise, for example, a dipole or patch radiator. If the base station antenna 100 is a dual-polarized antenna, each radiator 126 may comprise, for example, a cross-dipole structure. Each radiator 126 may be disposed in a plane that is substantially perpendicular to a longitudinal axis of the corresponding stalk 124 of the radiating element 122. The longitudinal axis of each stalk 124 may be pointed towards the longitudinal axis of the cylindrical lens 140.

Similarly, each high-band radiating element 132 may comprise a stalk 134 and a radiator 136. The radiator 136 may comprise, for example, a dipole or patch radiator. If the base station antenna 100 is a dual-polarized antenna, each radiator 136 may comprise, for example, a cross-dipole structure. Each radiator 136 may be disposed in a plane that is substantially perpendicular to a longitudinal axis of the corresponding stalk 134 of the radiating element 132. The longitudinal axis of each stalk 134 may be pointed towards the longitudinal axis of the cylindrical lens 140.

Typically, the radiating elements of a base station antenna are spaced about one-quarter wavelength above an underlying reflector, where the wavelength is the wavelength corresponding to the center frequency of the RF signals that are transmitted/received via the radiating element. For the low-band signals, which typically are in the 690-960 MHz range, one-quarter wavelength is a relatively large distance, and hence it may be difficult to provide a compact base station antenna. For example, referring to FIG. 2, it can be seen that the cylindrical lens 140 is positioned in front of the low-band array 120. Since the center frequency of the high band is typically two or even three times larger than the center frequency of the low-band, if conventional low-band radiating elements are used (not shown in FIG. 2), these conventional low-band radiating elements would extend 2-3 times farther in front of the backplane 110 than do the high-band radiating elements 132. Since the RF lens 140 may also be relatively large, the depth of the base station antenna 100 will be quite large if conventional low-band radiating elements are used. Additionally, the high-band radiating elements 132 typically should be located in close proximity to the cylindrical RF lens 140. To accomplish this, the high-band radiating elements 132 would need to be positioned more forwardly than shown in FIG. 2. However, if the high-band radiating elements are moved in this manner, the high-band radiating elements 132 may at least partially block the low-band radiating elements 122, which can degrade performance in both the low-band and the high-band.

In order to ameliorate this issue, as shown in FIG. 2, the base station antenna 100 may further include a material 150 that has an artificial magnetic conductor or "AMC" surface. AMC material surfaces are also referred to as meta-surfaces, reactive impedance surfaces and meta-material surfaces. The use of an AMC material 150 may allow the low-band radiating elements 122 to be positioned much closer to the underlying backplane 110. As a result, the antenna 100 may be made more compact and the problem of the high-band radiating elements 132 blocking and/or interfering with the low-band radiating elements 122 may be reduced.

In some embodiments, the AMC material may comprise a metallic ground layer, a grounded dielectric substrate on the metallic ground layer, and periodical patches on the grounded dielectric substrate, where the periodicity of the patches is much smaller than the wavelength. The inclusion of the AMC material 150 may allow the low-band radiating elements 122 to have much shorter stalks 124, and hence the radiators 126 of the low-band radiating elements 122 may be positioned much closer to the backplane 110 of the antenna 100.

While the RF lens 140 is described as being a cylindrical RF lens 140 that extends, for example, the length of the low-band array 120 and/or the high-band arrays 130-1, 130-2, it will be appreciated that in other embodiments the RF lens 140 may comprise a plurality of spherical RF lenses 140 that are arranged in a vertical column. One low-band radiating element 122 and two high-band radiating elements 132 may be positioned between each such spherical RF lens 140 and the backplane 110 in such embodiments. Elliptical RF lenses could be used in other embodiments.

Figure 3A:
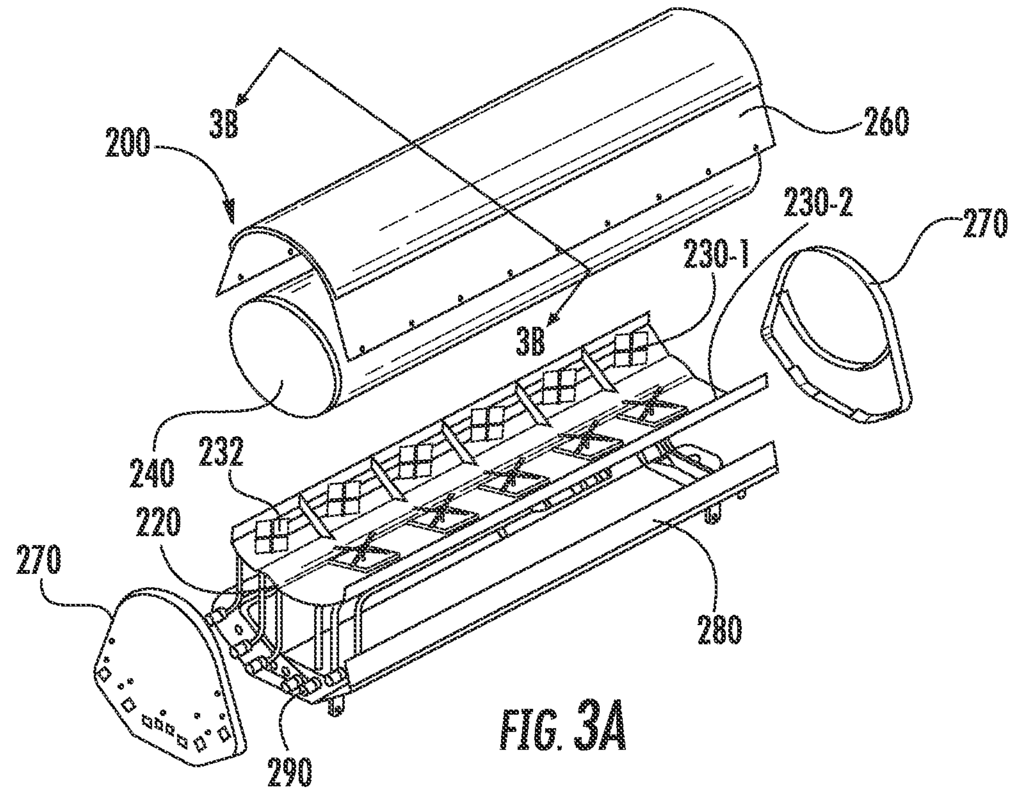
FIG. 3A is a perspective view of a multi-beam antenna according to embodiments of the present invention that includes a cylindrical lens.
Figure 3B:
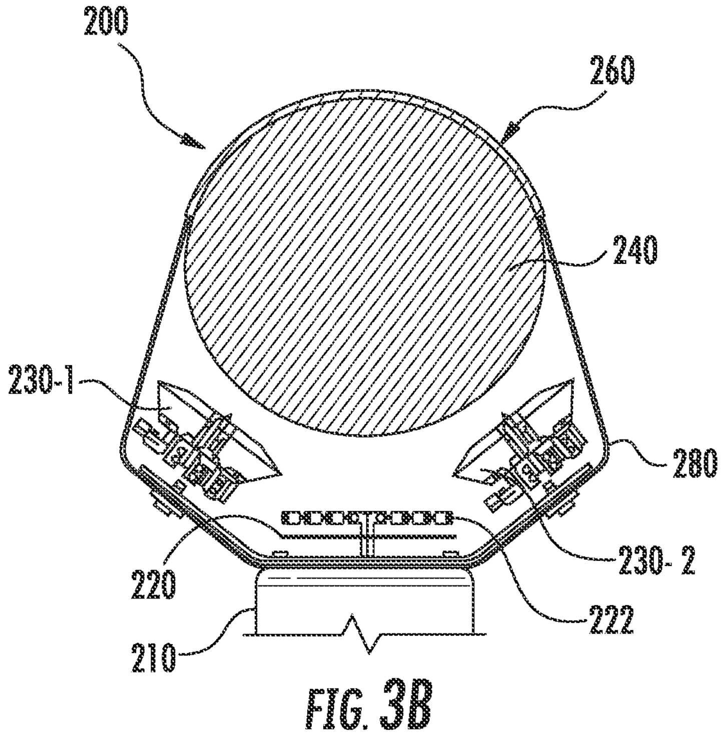
FIG. 3B is a cross-sectional view of the multi-beam antenna of FIG. 3A.
Figure 3C:
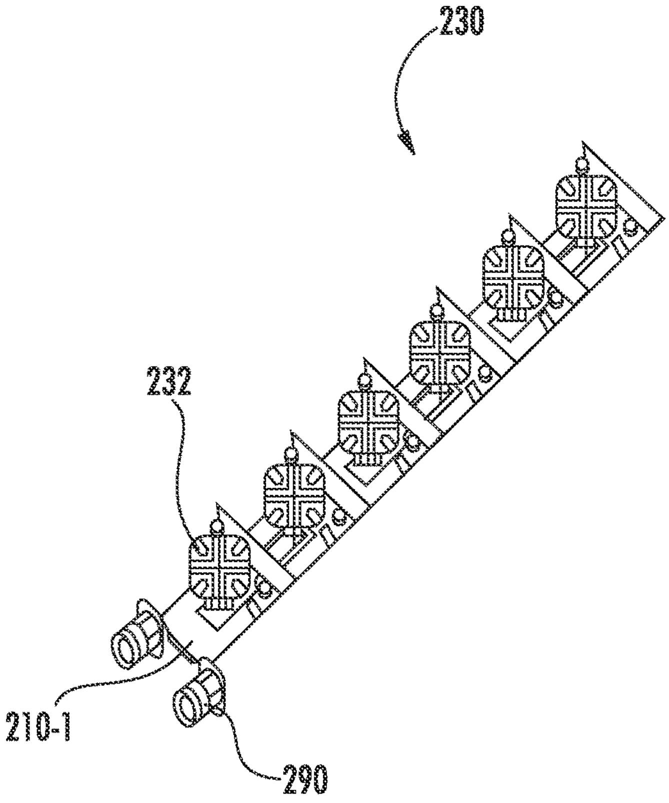
FIG. 3C is a schematic perspective view of a high-band linear array included in the multi-beam antenna of FIG. 3A.
Figure 3D:
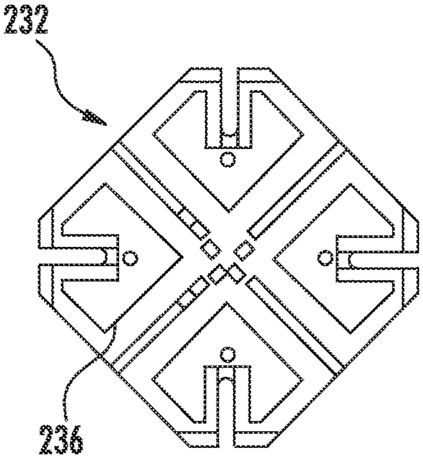
FIG. 3D is a plan view of one of the dual polarized high-band radiating elements included in the linear array of FIG. 3C.
Figure 3E:
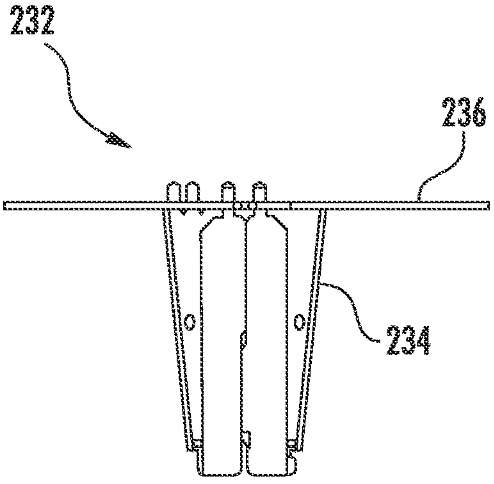
FIG. 3E is a side view of the dual polarized high-band radiating element of FIG. 3D.
Figure 3F:
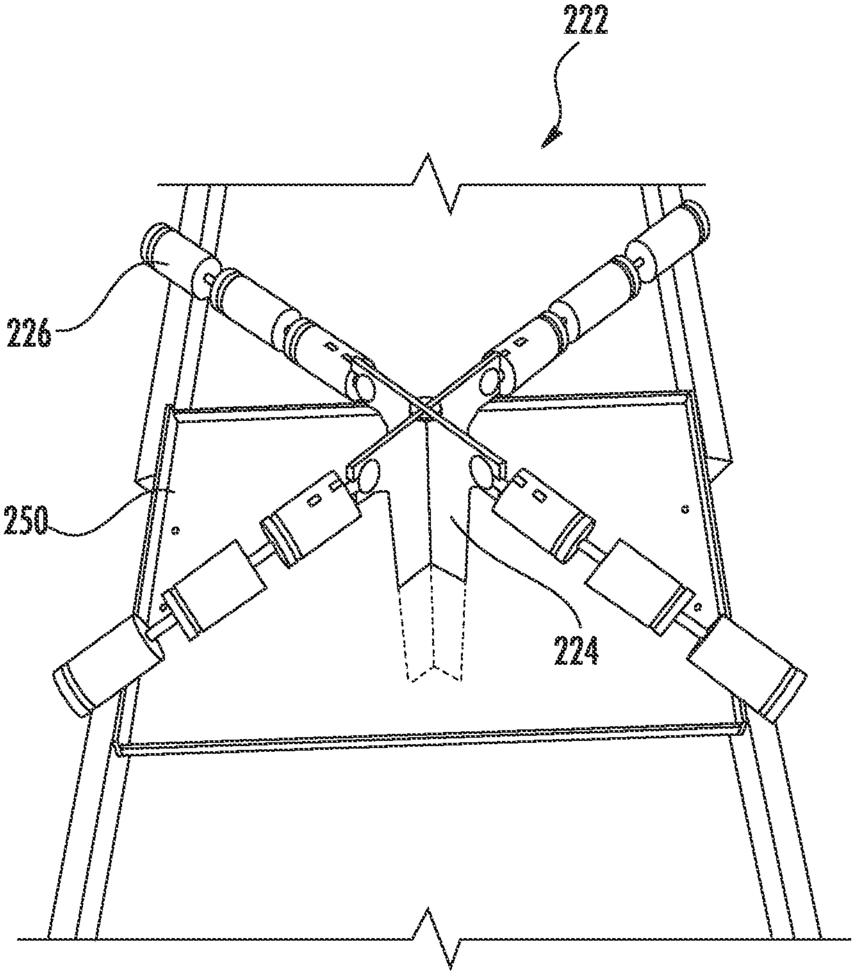
FIG. 3F is a perspective view of one of the low-band radiating elements included in the multi-beam antenna of FIG. 3A.

FIGS. 3A-3E illustrate one example of a lensed, dual-band multi-beam base station antenna 200 that has the general structure of the base station antenna 100 of FIG. 2. In particular, FIG. 3A is a perspective view of the lensed dual-band multi-beam base station antenna 200, and FIG. 3B is a cross-sectional view of the antenna 200 taken along line 3B-3B of FIG. 3A. FIG. 3C is a perspective view of a linear array included in the antenna 200, and FIGS. 3D and 3E are a plan view and side view, respectively, of one of the high-band dual polarized radiating elements included in the linear array of FIG. 3C. FIG. 3F is a perspective view of one of the low-band dual polarized radiating elements. The lensed dual polarized multi-beam base station antenna 200 generates one low-band antenna beam and two high-band antenna beams. When the antenna 200 is mounted for use, the azimuth plane is perpendicular to the longitudinal axis of the antenna 200, and the elevation plane is parallel to the longitudinal axis of the antenna 200.

Referring to FIGS. 3A and 3B, the base station antenna 200 includes a linear array 220 of low-band radiating elements 222 and first and second linear arrays 230-1, 230-2 of high-band radiating elements 232. The radiating elements 222, 232 are mounted on a backplane 210. The backplane 210 may comprise, for example, one or more metal sheets that serve as both a reflector for the antenna and a ground plane for the radiating elements 222, 232. The antenna 200 further includes a cylindrical RF Jens 240. In some embodiments, each high-band linear array 230 may have approximately the same length as the cylindrical RF lens 240. The multi-beam base station antenna 200 may also include one or more of a radome 260, end caps 270, a tray 280 and input/output ports 290.

The cylindrical RF lens 240 is used to focus the radiation coverage patterns or "antenna beams" of the respective high-band linear arrays 230 in the azimuth direction. For example, the cylindrical RF lens 240 may shrink the 3 dB beam widths of the respective antenna beams output by the high-band linear arrays 230 from about 65 degrees to about 33 degrees in the azimuth plane. While the antenna 200 includes two high-band linear arrays 230, it will be appreciated that different numbers of high-band linear arrays 230 may be used in other embodiments.

The antenna 200 may be designed so that the cylindrical RF lens 240 does not significantly narrow the beamwidth of the low-band linear array 220. One way to accomplish this is to select a diameter for the cylindrical RF lens 240 that is sufficient to provide the necessary narrowing of the azimuth beamwidth of the high-band linear arrays 230 but that is small enough that the cylindrical RF lens 240 will not significantly narrow the azimuth beamwidth of the low-band linear array 220. The azimuth beamwidth of the individual radiating elements 222 in the low-band linear array 220 may, for example, be selected so that the low-band array 220 will have a half-power beamwidth of about 65 degrees in some embodiments. In other embodiments, the cylindrical RF lens 240 will perform at least some narrowing of the azimuth beamwidth of the low-band linear array 220. In such embodiments, the low-band array 220 may be designed to have a half-power azimuth beamwidth of, for example, about 90 degrees that the cylindrical RF lens 240 narrows to about 65 degrees.

The low-band radiating elements 222 that form the low-band linear array 220 may comprise, for example, dipole, patch or any other appropriate radiating elements. In some embodiments the low-band radiating elements 222 may comprise patch radiating elements as these radiating elements may have a relatively low profile. As shown best in FIG. 3F, in the depicted embodiment, each low-band radiating element 222 is implemented as a cross-polarized radiating element 222 that includes a pair of stalks 224 and a pair of radiators 226. In the depicted embodiment, one radiator 226 of the pair radiates RF energy with a +45 degrees polarization and the other radiator 226 of the pair radiates RF energy with a −45 degrees polarization.

The high-band radiating elements 232 that form the high-band linear arrays 230-1, 230-2 may also comprise, for example, dipole, patch or any other appropriate high-band radiating elements. As shown in FIGS. 3D-3E, each high-band radiating element 232 may be implemented as a cross-polarized radiating element that includes a pair of stalks 234 and a pair of radiators 236.

The cylindrical RF lens 240 narrows the half power beam width of the antenna beams formed by each of the high-band linear arrays 230 while increasing the gain of the high-band antenna beams by, for example, about 2-2.5 dB. Both high-band linear arrays 230 share the same cylindrical RF lens 240, and thus each high-band linear array 230 has its HPBW altered in the same manner.

The high-band radiating elements 232 may be mounted in close proximity to the cylindrical RF lens 240. However, as discussed above with reference to FIG. 2, the low-band radiating elements 222 typically are larger than the high-band radiating elements 232 as the low-band radiating elements 222 are designed to transmit and receive at lower frequencies. As a result, there may not be sufficient room to mount the low-band radiating elements 222 between the backplane 210 and the cylindrical RF lens 240. In order to increase the amount of room available, an AMC material 250 may be mounted between the radiators 226 of the low-band radiating elements 222 and the reflector 210.

As noted above, a radiating element for a base station antenna is typically mounted at about one-quarter wavelength from an underlying backplane/reflector so that the radiation that is emitted rearwardly by the radiating element will be reflected forwardly to add constructively with the radiation emitted by the radiating element in the forward direction. By mounting the low-band radiating elements 222 on an AMC material 250 it may be possible to mount the low-band radiating elements 222 much closer to the backplane 210, as discussed above. This may significantly reduce the size of the antenna 200 and may help ensure that the low-band and high-band radiating elements 222, 232 point through the cylindrical RF lens 240 in the proper direction without overlapping each other.

The lensed dual-band multi-beam base station antenna 200 may be used to increase system capacity. For example, a conventional dual-band 65 degree azimuth HPBW antenna could be replaced with the lensed multi-beam base station antenna 200 as described above. This would increase the traffic handling capacity for the high-band, as each high-band antenna beam would have 2-2.5 dB higher gain and hence could support higher data rates at the same quality of service. The azimuth angles for the two antenna beams generated by the high-band linear arrays 230 may be approximately perpendicular to the respective portions of the backplane on which each high-band linear array 230 is mounted. The high-band antenna beams may be positioned adjacent each other and may each be designed to have a half-power azimuth beam width of about 33 degrees so that the antenna 200 may provide coverage for a 120 degree sector.

In some embodiments, the cylindrical RF lens 240 may be formed of a composite dielectric material 242 that has a generally homogeneous dielectric constant throughout the lens structure. The cylindrical RF lens 240 may also, in some embodiments, include a shell such as a hollow, lightweight structure that holds the dielectric material 242. This is in contrast to a conventional Luneburg lens that is formed of multiple layers of dielectric materials that have different dielectric constants. The cylindrical RF lens 240 may be easier and less expensive to manufacture as compared to a Luneburg lens, and may also be more compact. In one embodiment, the cylindrical RF lens 240 may be formed of a composite dielectric material having a generally uniform dielectric constant of approximately 1.5 to 3.0 and a diameter of about 2 wavelengths (2) of the center frequency of the signals that are to be transmitted through the high-band radiating elements 232.

The antenna 200 of FIGS. 3A-3B has a cylindrical RF lens 240 that has a flat top and a flat bottom, which may be convenient for manufacturing and/or assembly. However, it will be appreciated that in other embodiments an RF lens may be used instead that has rounded (hemispherical) ends. The hemispherical end portions may provide additional focusing in the elevation plane for the radiating elements 232 at the respective ends of the high-band linear arrays 230 and/or reduction of the sidelobes of the central beam. This may improve the overall gain of the high-band linear arrays 230. Other shapes may also be used.

The cylindrical RF lens 240 may be formed using any of a variety of composite dielectric materials. Example composite dielectric materials that are suitable for forming the RF lens used in base station antennas according to embodiments of the present invention will be discussed in greater detail below. Any of the composite dielectric materials discussed below may be used to form the cylindrical RF lens 240, as may any other suitable dielectric material.

FIG. 3C is a schematic perspective view of one of the high-band linear arrays 230 that is included in the lensed dual-band multi-beam base station antenna 200 of FIGS. 3A-3B. The linear array 230 includes a plurality of radiating elements 232, a reflector 210-1 and two input connectors 290. The linear array 230 may also include phase shifters (not shown) that are used for beam scanning (beam tilting) in the elevation plane.

FIGS. 3D-3E illustrate one of the high-band radiating elements 232 in greater detail. In particular, FIG. 3D is a plan view of one of the dual polarized radiating elements 232, and FIG. 3E is a side view of the dual polarized radiating element 232. As shown in FIG. 3D, each radiating element 232 includes four dipole segments that are arranged in a square or "box" arrangement to form a pair of radiators 236. The four dipole segments are supported by feed stalks 234, as illustrated in FIG. 3E. Each radiating element 232 may comprise two linear orthogonal polarizations (slant+45°/−45 degrees). It will be appreciated that any appropriate radiating elements 232 may be used.

The use of a cylindrical RF lens such as lens 240 may reduce grating lobes (and other far sidelobes) in the elevation plane. The reduction in the size of the grating lobes occurs because the cylindrical RF lens 240 focuses the main beam only and defocuses the far sidelobes. This allows increasing the spacing between the antenna elements 232 in the high-band linear arrays 230, and hence a desired elevation beam width may be achieved with fewer radiating elements 232 per high-band linear array 230 as compared to a non-lensed antenna. In non-lensed antennas, the spacing between radiating elements in the array may be selected to control grating lobes using the criterion that $d_{max}/\lambda<1/(\sin\theta_0+1)$, where $d_{max}$ is maximum allowed spacing, λ is the wavelength and Go is scan angle. In the lensed antenna 200, spacing $d_{max}$ can be increased: $d_{max}/\lambda=1.2\sim1.3[1/(\sin\theta_0+1)]$. So, the cylindrical RF lens 240 allows the spacing between the high-band radiating elements 232 to be increased for the multi-beam base station antenna 200 while reducing the number of radiating elements by 20-30%. This results in additional cost advantages for the lensed multi-beam base station antenna 200.

Referring again to FIGS. 3A and 3B, the radome 260, end caps 270 and tray 280 protect the antenna 200. The radome 260 and tray 280 may be formed of, for example, extruded plastic, and may be multiple parts or implemented as a monolithic structure. In other embodiments, the tray 280 may be made from metal and may act as an additional reflector to improve the front-to-back ratio for the antenna 200. In some embodiments, an RF absorber (not shown) can be placed between the tray 280 and the linear arrays 220, 230 for additional back lobe performance improvement. The cylindrical RF lens 240 is spaced such that the apertures of the high-band linear arrays 230 point at a center (longitudinal) axis of the cylindrical RF lens 240.

Thus, the lensed multi-beam antenna 200 is a dual band antenna that provides twin antenna beams in the high-band and a single antenna beam in the low-band. The antenna 200 may be very compact, as the diameter of the cylindrical RF lens 240 is based on the frequency of the high-band linear arrays 230, and hence a smaller cylindrical RF lens 240 may be used. In example embodiments, the diameter D of the cylindrical RF lens may be about D=1.5-6λ (where λ is the wavelength in free space of the center frequency of the transmitted signal). Additionally, because the AMC material 250 allows the low-band radiating elements 222 to be positioned very close to the backplane 210, the low band radiating elements 222 may be positioned between the cylindrical RF lens 240 and the backplane 210 and hence may require little or no extra space. The AMC material 250 also allows the low-band radiating elements 222 to be spaced farther away from the high-band radiating elements 232, which may reduce the amount that the low-band radiating elements 222 scatter the transmitted or received high-band RF energy.

Figure 4:
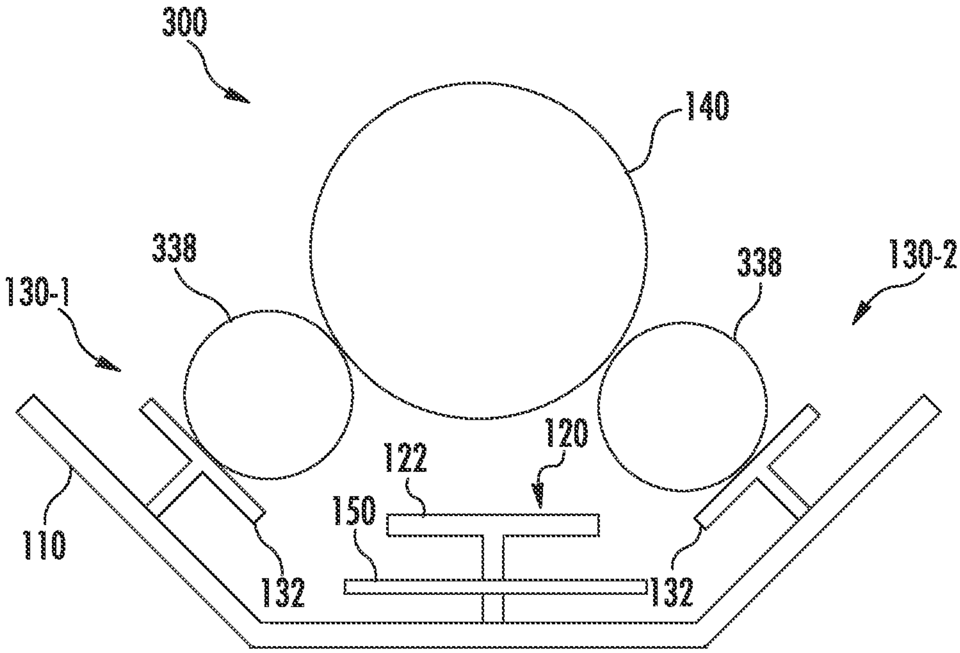
FIG. 4 is a schematic top view of a base station antenna according to further embodiments of the present invention that includes secondary lenses.

FIG. 4 is a schematic top view of a base station antenna 300 according to further embodiments of the present invention. As shown in FIG. 4 the base station antenna 300 may be very similar to the base station antennas 100, 200 that are described above. Accordingly, in FIG. 4 like elements to the base station antenna 100 have been identified with like reference numerals, and further description of these elements will be omitted.

As is shown in FIG. 4, the lensed dual-band multi-beam base station antenna 300 differs from base station antenna 100 in that it further includes a pair of secondary lenses 338. A secondary lens 338 can be placed between each high-band linear array 130-1, 130-2 and the RF lens 140. The secondary lenses 338 may further focus the high-band RF energy. The secondary lenses 338 may also help stabilize the beamwidth of the high-band antenna pattern in the azimuth plane. The secondary lenses 338 may also compensate for the effect of the main RF lens 140 on the pattern of the low-band linear array 120. The secondary lenses 338 may be formed of dielectric materials and may be shaped as, for example, rods, cylinders or cubes. Other shapes may also be used. The transverse cross-sectional width or diameter of each secondary lens 338 may be substantially smaller than the diameter of the main RF lens 140.

When secondary lenses 338 are included in the antenna, the main cylindrical RF lens 140 may be positioned at a greater distance from the backplane 110. As a result, more room may be provided for the low-band radiating elements 122. In some cases, therefore, the AMC material 150 may be omitted.

The amount of focusing performed by the secondary lenses 338 may be highly dependent on the frequency of the RF signals. For example, in one embodiment, the antenna beam output by each secondary lens 338 may have a half-power beamwidth of, for example, 60 degrees at 1.7 GHZ and a half-power beamwidth of 40 degrees at 2.7 GHZ. Notably, the main cylindrical RF lens 140 may be designed to operate in the reverse manner. In particular, the diameter, dielectric constant and other parameters of the main cylindrical RF lens 140 may be selected so that 1.7 GHz a signal passes through most or all of the main cylindrical RF lens 140 while a 2.7 GHZ RF signal will only pass through a central portion of the main cylindrical RF lens 140. As a result, the main cylindrical RF lens 140 will focus the 1.7 GHZ RF signal more than the 2.7 GHZ RF signal. Consequently, the combination of the main cylindrical RF lens 140 and the secondary RF lenses 338 may be used to form high-band antenna beams having a beamwidth of, for example, 33 degrees across the entire 1 GHz frequency range of the high-band (i.e., from 1.7 GHz to 2.7 GHZ).

Figure 5:
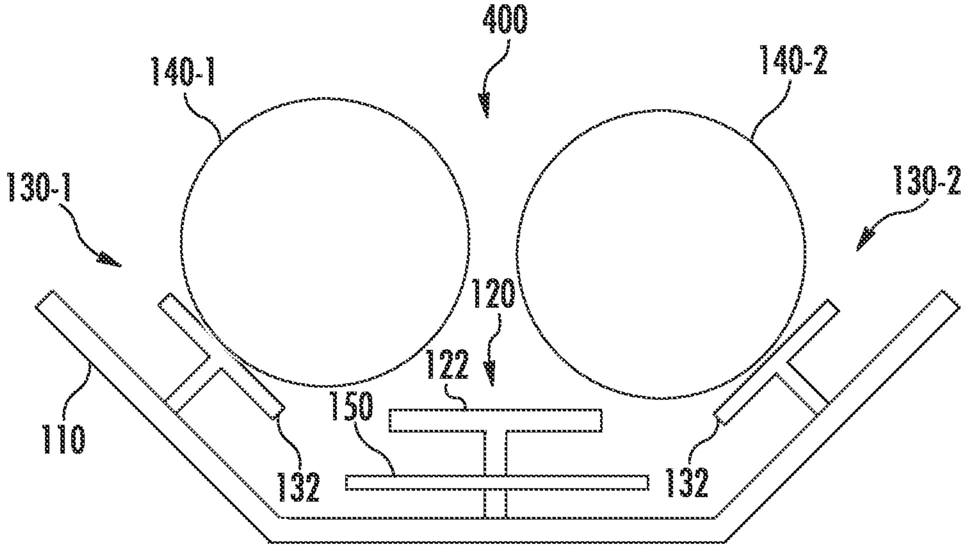
FIG. 5 is a schematic top view of a base station antenna according to still further embodiments of the present invention that includes a pair of cylindrical RF lenses.

FIG. 5 is a schematic top view of a base station antenna 400 according to still further embodiments of the present invention. As shown in FIG. 5, the base station antenna 400 is similar to the base station antennas 100, 200 that are described above. Accordingly, in FIG. 5 like elements to the base station antenna 100 have been identified with like reference numerals, and further description of these elements will be omitted.

As is shown in FIG. 5, the lensed dual-band multi-beam base station antenna 400 differs from base station antenna 100 in that the base station antenna 400 includes a pair of main cylindrical RF lenses 140-1, 140-2, as opposed to the single cylindrical RF lens 140 included in the base station antenna 100. One potential advantage of this arrangement is that it may be possible to locate each cylindrical lens 140-1, 140-2 closer to the radiating elements 132 of the respective high-band linear arrays 130-1, 130-2. The base station antenna 400 may also have more room for the low-band radiating elements 122, which may allow use of a wider range of low-band radiating elements 122 and/or which may reduce the amount of interaction between the low-band and high-band signals. The base station antenna 400 may be more expensive than the base station antennas 100, 200, 300 described above due to the provision of the second cylindrical RF lens 140, and may also need to be wider and perhaps deeper, which is generally undesirable. It will be appreciated that in further embodiments the secondary lenses 338 of base station antenna 300 could be added to the base station antenna 400.

Figure 6A:
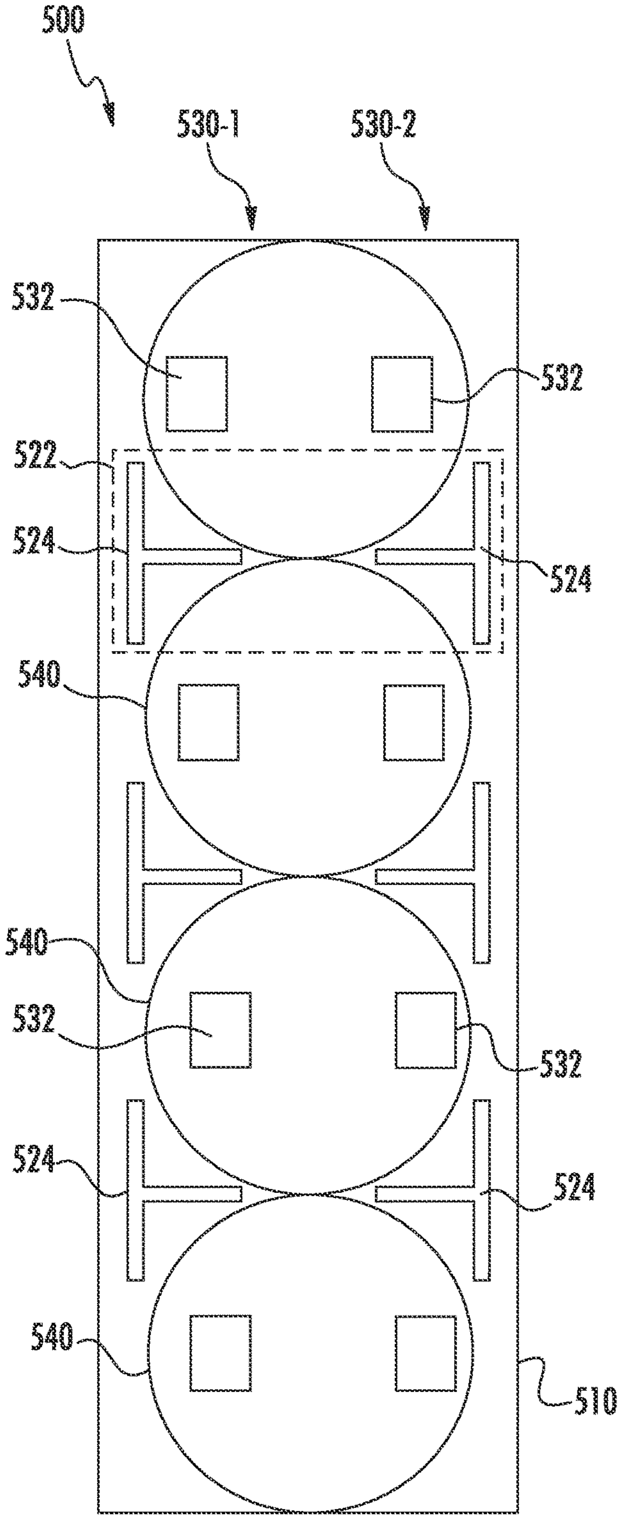
FIGS. 6A and 6B are a schematic front view and side view, respectively, of a base station antenna according to yet another embodiment of the present invention.
Figure 6B:
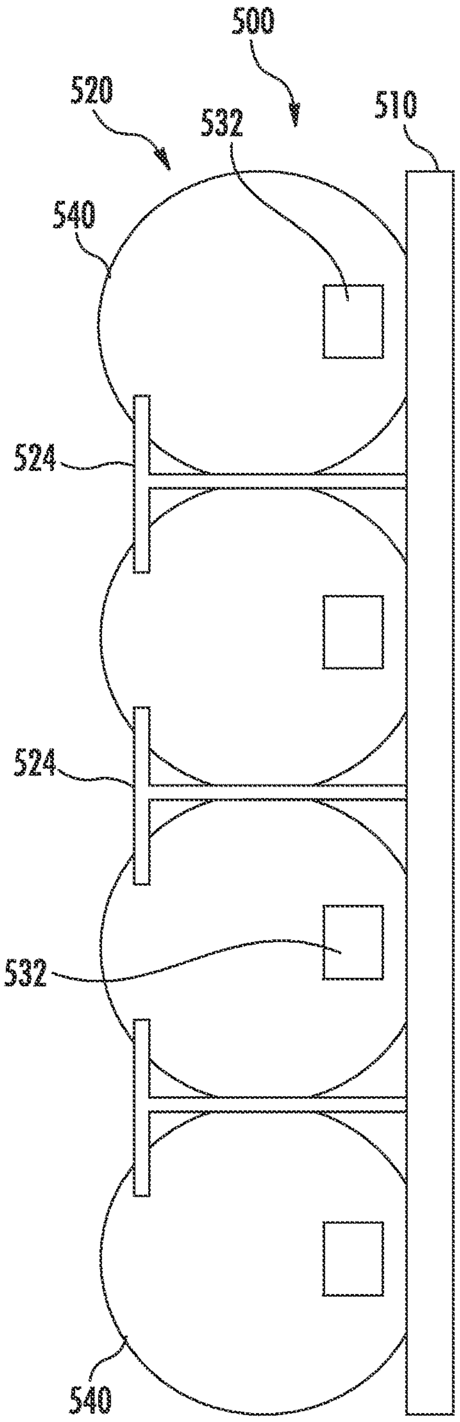

FIGS. 6A and 6B are a schematic front view and side view, respectively, of a base station antenna 500 according to yet another embodiment of the present invention. As shown in FIG. 6A-6B, the base station antenna 500 includes a backplane 510, a low-band linear array 520 that includes a plurality of low-band radiating elements 522, first and second high-band linear arrays 530-1, 530-2 that each include a plurality of high-band radiating elements 532 and a plurality of spherical RF lenses 540 that are mounted in a vertical column in front of the backplane 510. The backplane 510 may be mounted in a vertical orientation. The backplane 510 may act as a reflector for the low-band radiating elements 522. Separate reflectors (not shown) may be provided for the high-band radiating elements 532 in some embodiments.

As shown in FIGS. 6A-6B the dual-band multi-beam antenna 500 includes two high-band radiating elements 532 for each spherical RF lens 540. The spherical RF lenses 540 are positioned in front of, and midway between, the two columns of high-band radiating elements 532. In the example embodiment depicted in FIGS. 6A-6B, a total of eight high-band radiating elements 532 are provided (four per column) and a total of four spherical RF lenses 540 are provided. Each high-band linear array 530 may include its own source (a radio). For example, the first high-band linear array 530-1 may be fed by respective first and second corporate feed networks (not shown) that are connected to respective first and second ports of a first radio that supply RF signals at each of the two orthogonal polarizations to the radiating elements 532 in the first high-band linear array 530-1, and the second high-band linear array 530-2 may be fed by third and fourth corporate feed networks (not shown) that are connected to third and fourth ports of a second radio that supply RF signals at each of the two orthogonal polarizations to the radiating elements 532 in the second high-band linear array 530-2. Additional radios may be provided if the high-band radiating elements 532 are wide-band radiating elements that support multiple cellular services within the high-band. If such additional radios are provided, diplexers may also be provided to connect multiple radios to each radiating element 532.

The antenna 500 may produce two independent high-band antenna beams (with each beam supporting two polarizations) that are aimed at different azimuth angles. As a result, the antenna 500 may be used to further sectorize a cellular base station. For example, the antenna 500 may be designed to generate two side-by-side beams in the azimuth plane that each have a half power azimuth beamwidth of about 33 degrees. Three such antennas 500 could be used to form a six-sector cell.

The low-band linear array 520 includes four low-band radiating elements 522. Each low-band radiating element 522 is implemented as a pair of "tri-pol" elements 524 that are used, for example, to create a low-band antenna beam having an azimuth half-power beam width of 40-50 degrees. The tri-pol elements 524 are arranged in vertical columns along each side of the backplane 510. Each pair of tri-pol elements 524 is arranged between adjacent ones of the spherical RF lenses 540. The tri-pol elements 524 may be mounted at a relatively large distance from the backplane 510 so that the radiators of the tri-pol elements 524 are arranged at heights above the backplane 510 similar to the heights of the spherical RF lenses 540. As a result of the height and placement of the tri-pol elements 524, little or none of the forwardly-directed RF energy that is emitted by the low-band radiating elements 522 will pass through the spherical RF lenses 540, although some portion of the backwardly emitted low-band RF signals may pass through the spherical RF lenses 540. As a result, the spherical RF lenses 540 will only have a relatively minor impact on the low-band antenna pattern, while the spherical RF lenses 540 may be used to significantly narrow the high-band antenna patterns.

The first and second high-band linear arrays 530-1, 530-2 may extend in respective first and second vertical columns that may be generally perpendicular to the horizontal plane defined by the horizon when the base station antenna 500 is mounted for use. The spherical RF lenses 540 may likewise be mounted in a vertical column. The high-band radiating elements 532 may be mounted between the backplane 510 and the column of spherical RF lenses 540. As shown best in FIG. 6A, one high-band radiating element 532 from each high-band linear array 530 may be positioned behind each spherical RF lens 540 so that a total of two high-band radiating elements 532 are positioned behind each spherical RF lens 540. Each radiating element 532 may be positioned at the same distance from its associated spherical RF lens 540 as are the other radiating elements 532 with respect to their associated spherical RF lenses 540. Each radiating element 532 may be located along the "equator" of its associated spherical RF lens 540 (i.e., the lens 540 that the radiating element 532 is positioned behind), where the "equator" refers to the horizontal cross-section of the spherical RF lens 540 that has the largest diameter.

The high-band radiating elements 532 are illustrated schematically in FIGS. 6A-6B. Each high-band radiating element 532 may comprise, for example, a dipole, a patch or any other appropriate radiating element. In an example embodiment, the radiating elements 532 may be implemented as the radiating elements 232 that are depicted in FIGS. 3D-3E.

Each spherical RF lens 540 is used to focus (narrow) the antenna beam formed by its associated high-band radiating elements 532 in both the azimuth and elevation planes. The spherical RF lens 540 may include (e.g., be filled with or consist of) a dielectric material having a dielectric constant of about 1 to about 3 in some embodiments. The dielectric material of the spherical RF lens 540 focuses the RF energy that radiates from, and is received by, the associated high-band radiating elements 532. A variety of suitable composite dielectric materials that may be used to form the spherical RF lenses 540 are discussed below.

The use of the spherical RF lenses 540 included in the antenna 500 may provide several advantages as compared to the cylindrical RF lenses used in the antennas 100, 200, 300, 400 that are described above. First, an array of spherical RF lenses 540 may be significantly smaller than an equivalent cylindrical RF lens. Accordingly, the use of the spherical RF lenses 540 may reduce the size, cost and weight of the antenna 500. Second, the spherical RF lenses 540 may be used to narrow the beam in both the azimuth and elevation directions, which may be desirable in many applications. Third, the spherical RF lenses 540 may maintain beam pattern shape when electronically tilted for purposes of changing the coverage area of the antenna 500. Fourth, the spherical RF lenses 540 may have less effect on the low-band radiating elements 522 than would a cylindrical RF lens since each spherical RF lens 540 may be tuned with respect to a single low-band radiating element 522 (assuming there is one low-band array 520).

Figure 7A:
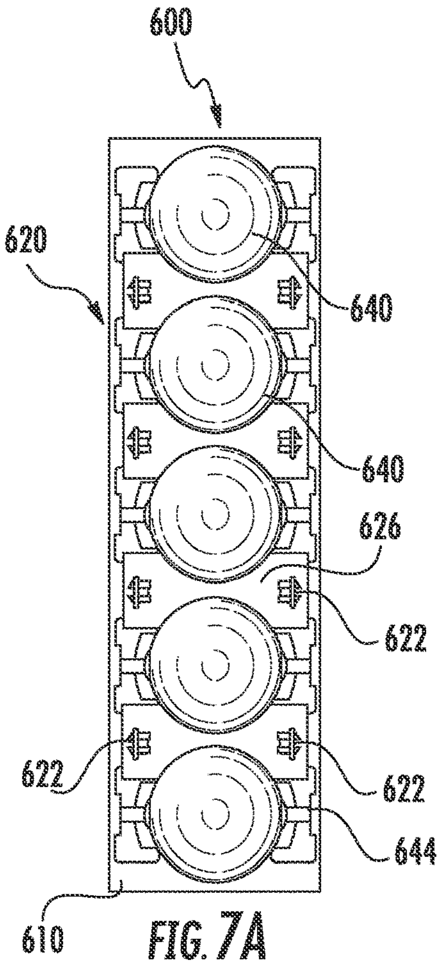
FIG. 7A is a front view of a lensed multi-beam antenna according to embodiments of the present invention.
Figure 7B:
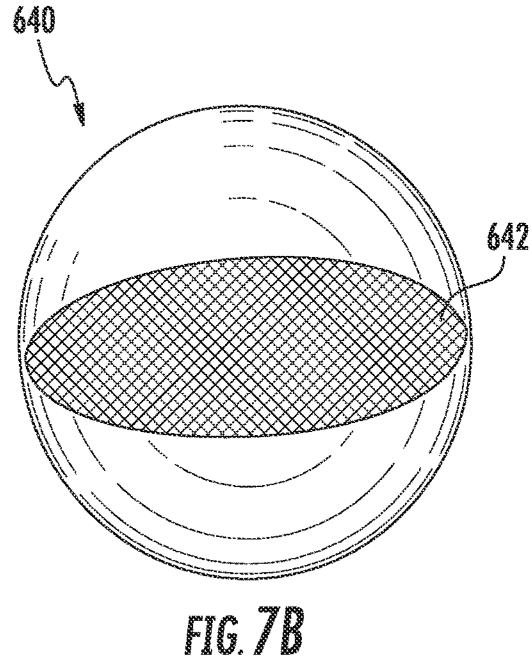
FIG. 7B is a perspective view of one of the spherical RF lenses included in the lensed multi-beam antenna of FIG. 7A.
Figure 7C:
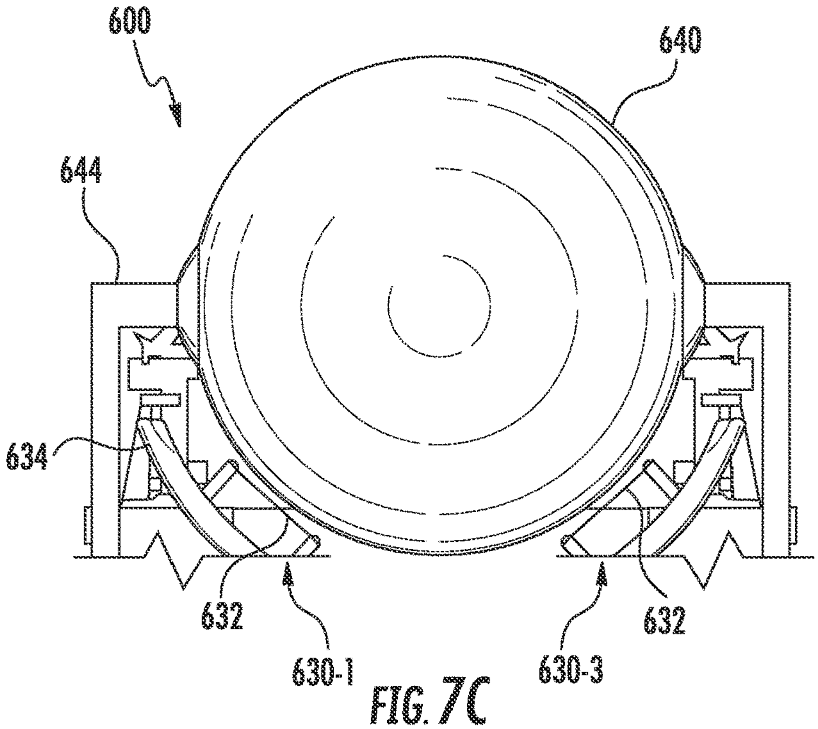
FIG. 7C is a side view of one of the spherical RF lenses included in the lensed multi-beam antenna of FIG. 7A that illustrates how the lens is held in place in front of the radiating elements.
Figure 7D:
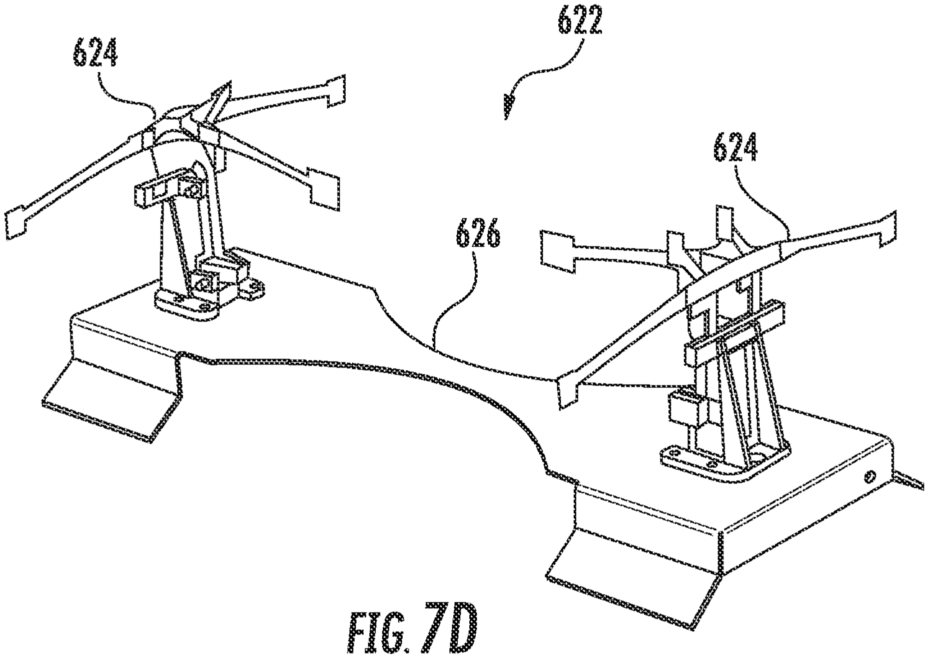
FIG. 7D is a perspective view of a low-band radiating element included in lensed multi-beam antenna of FIG. 7A.
Figure 7E:
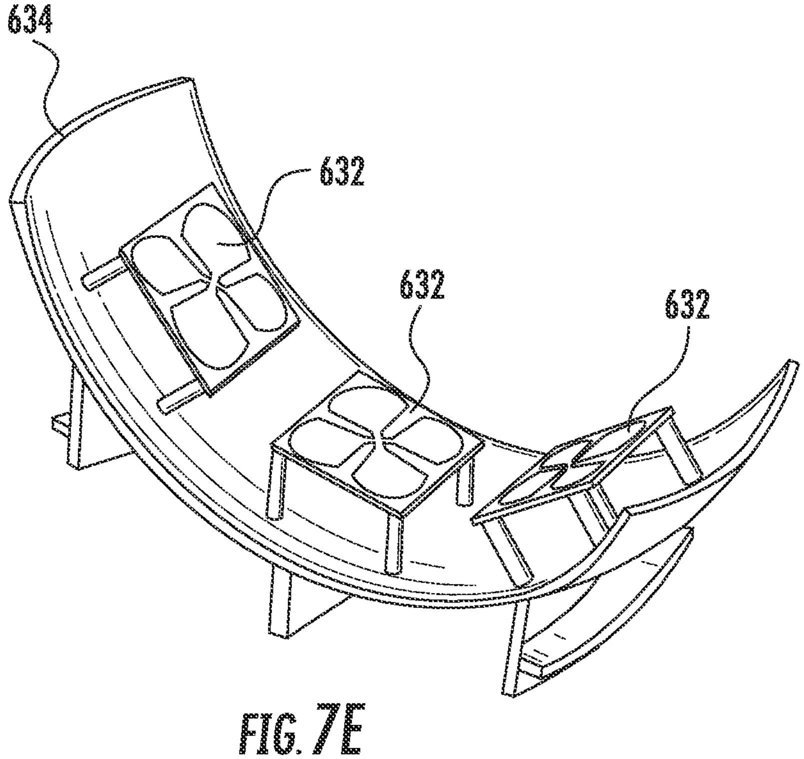
FIG. 7E is an enlarged perspective view of a curved reflector of the lensed multi-beam antenna of FIG. 7A that includes three high band radiating elements mounted thereon.

FIGS. 7A-7E illustrate a lensed dual-band multi-beam antenna 600 according to embodiments of the present invention. In particular, FIG. 7A is a front view of the antenna 600, FIG. 7B is a perspective view of one of the spherical RF lenses included in the antenna 600, and FIG. 7C is a perspective view of one of the spherical RF lenses that illustrates how the spherical RF lens is held in place. FIG. 7D is a perspective view of a low-band radiating element included in the antenna 600, and FIG. 7E is an enlarged perspective view of a curved reflector of the antenna of 600 that includes three high-band radiating elements mounted thereon.

As shown in FIGS. 7A-7E, the antenna 600 includes a backplane 610, a low-band array 620 of low-band radiating elements 622, first through third high-band arrays 630-1, 630-2, 630-3 of high-band radiating elements (array 630-2 is not visible in the drawings, although one radiating element 632 thereof is visible in FIG. 7E)) and five spherical RF lenses 640. The low-band radiating elements 622 comprise pairs of so-called "tri-pole" radiators 624. As can best be seen in FIG. 7A, each low-band radiating elements 622 is positioned between two adjacent spherical RF lenses 640. Positioning the low-band radiating elements 622 between the spherical RF lenses 640 may reduce the impact that the spherical RF lenses 640 may have on the low-band antenna beam. Additionally, as shown in FIG. 7B, in some embodiments the spherical RF lenses 640 may include a wire mesh or other frequency selective structure 642. The frequency selective structure 642 may be designed to be generally reflective to RF energy in the low-band and generally transparent to RF energy in the high-band. The positioning of the low-band radiating elements 622 with respect to the spherical RF lenses 640 and/or the inclusion of the frequency selective structures 642 in or on the spherical RF lenses 640 may reduce or eliminate the spherical RF lenses 640 significantly narrowing the beamwidth of the low-band RF signals. Consequently, in some embodiments, the low-band radiating elements 622 may have a half-power azimuth beam width, for example, about 40-50 degrees. The number of low-band radiating elements 622 included in the low-band array 620 may be selected to obtain a desired half-power elevation beam width. It will be appreciated, however, that in other embodiments, the antenna 600 may be designed to have a different half-power azimuth beam width.

FIG. 7D illustrates one of the low-band radiating elements 622 in greater detail. As shown in FIG. 7D, each low-band radiating element 622 comprise a pair of so-called "tri-pole" radiators 624. Low-band radiating elements 622 that are formed using tri-pole radiators such as radiators 624 are described, for example, in U.S. Pat. No. 9,077,070, issued Jul. 7, 2015, the entire content of which is incorporated herein by reference. Accordingly, the structure and operation of the tri-pole radiators 624 will not be discussed in detail herein. The pair of tri-pole radiators 624 may be mounted on a common reflective ground plane 626. As shown in FIG. 7A, the common reflective ground plane 626 may be positioned between two of the spherical RF lenses 640. The common reflective ground plane 626 may raise the height of the low-band radiating elements 622 relative to the spherical RF lenses 640 to further reduce the impact that the spherical RF lenses 640 may have on the low-band RF signals. In some embodiments, the common reflective ground plane 626 may be capacitively coupled to the frequency selective structures 642 in the adjacent spherical RF lenses 640.

As shown best in FIGS. 7C and 7E, the high-band radiating elements 632 may be implemented as cross-dipole radiating elements in some embodiments. As the antenna 600 includes three high-band arrays 630, a total of three cross-dipole high-band radiating elements 632 may be provided for each spherical RF lens 640. The three cross-dipole high-band radiating elements 632 that are associated with each spherical RF lens 640 may be mounted on a common reflector 634. The common reflector 634 may be a curved structure so that radiating emitted by each high-band radiating element 632, which is emitted in a direction normal to the plane defined by the cross-dipoles, is pointed at the center of the spherical RF lens 640 associated with each high-band radiating element 632. While not shown in FIGS. 7C and 7E, each high-band radiating element 632 will include a pair of feed stalks that feed the orthogonally polarized signals to the respective dipole radiating elements included in each high-band radiating element 632.

As shown in FIG. 7C, the spherical RF lenses 640 may be held in place in front of the high-band radiating elements 632 by a support structure 644. The support structure 644 may be mounted on the backplane 610. Each high-band radiating element 632 may be located at the same distance from its associated spherical RF lens 640. As shown in FIG. 7C, the separation distance between the high-band radiating elements 632 and their associated spherical RF lenses 640 may be very small in some embodiments.

While the embodiment of FIGS. 7A-7E includes three high-band linear arrays 630 that form three independent antenna beams, it will be appreciated that in other embodiments, more or fewer high-band arrays 630 may be provided. For example, in some cases, only two high band arrays 630 may be provided, in which case each reflector 634 would only include two high-band radiating elements 632 which would be located in the spaces that are between high-band radiating element 632 shown in FIG. 7E. In other embodiments, a greater number of high band arrays 630 (e.g., four) may be included in the antenna 600.

Figure 8A:
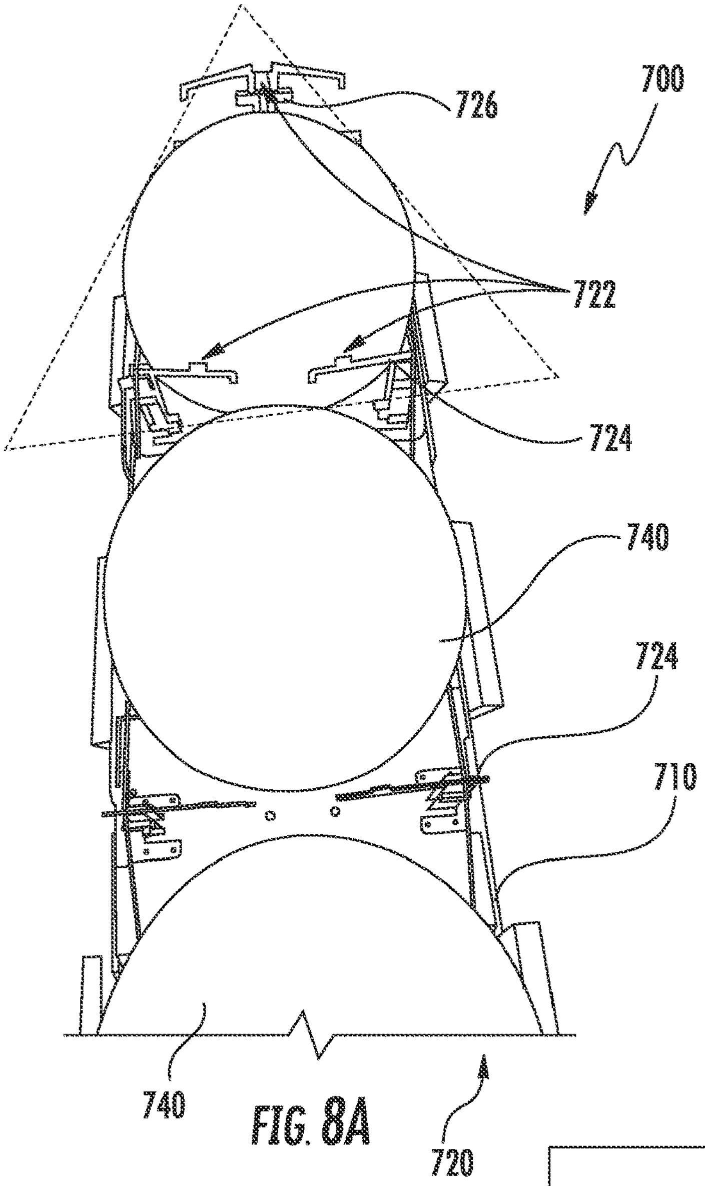
FIG. 8A is a partial perspective view of a lensed multi-beam antenna according to still further embodiments of the present invention.
Figure 8B:
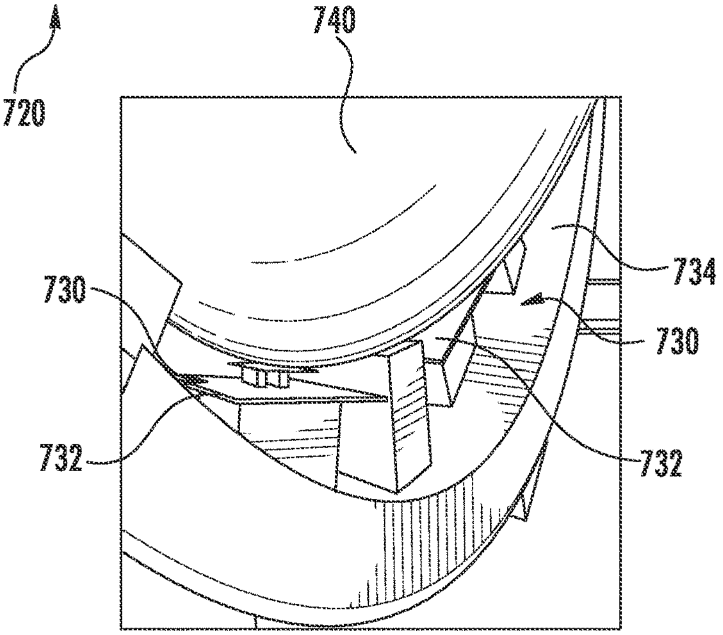
FIG. 8B is an enlarged perspective view of a portion of the lensed multi-beam antenna of FIG. 8A illustrating two of the high-band radiating elements thereof.

FIGS. 8A-8B illustrate a lensed dual-band multi-beam antenna 700 according to still further embodiments of the present invention. In particular, FIG. 8A is a partial perspective view of the antenna 700 and FIG. 8B is an enlarged perspective view of a portion of the antenna 700 that illustrates two of the high-band radiating elements thereof.

As can be seen from FIGS. 8A-8B, the antenna 700 is similar to the antenna 600 above. In particular, the antenna 700 includes a backplane 710, a low-band array 720 of low-band radiating elements 722, three high-band arrays 730 of high-band radiating elements 732 (the high-band radiating elements 732 of only two of the high-band arrays 730 are visible in FIG. 8B) and a plurality of spherical RF lenses 740. Each low-band radiating element 722 comprises a pair of tri-pole radiators 724 that are mounted across from each other along the outer edges of the backplane 710 along with a third tri-pole radiator 726 that is located on the opposite side of one of the spherical RF lenses 740 and positioned along the longitudinal axis of the backplane 710. In some embodiments, the center arm of the third tri-pole radiator 726 may touch or even penetrate the spherical RF lens 740 to reduce the size of the antenna 700. The three tri-pole radiators 724, 726 that form each low-band radiating element 722 may form a triangle 728 with one of the spherical RF lenses 740 positioned within the middle of the triangle.

While not shown in the figures, the spherical RF lenses 740 may include a frequency selective structure such as the frequency selective structure 642 discussed above with reference to FIG. 7B. The addition of the third tri-pole radiator 726 may increase the half-power azimuth beam width of the low-band array 720 to, for example, about 50-60 degrees.

As shown in FIG. 8B, the high-band radiating elements 732 may be implemented as cross-dipole radiating elements in some embodiments. As the antenna 700 includes three high-band arrays 730, a total of three cross-dipole high-band radiating elements 732 may be provided for each spherical RF lens 740 (only two are visible in FIG. 8B). The three cross-dipole high-band radiating elements 732 that are associated with each spherical RF lens 740 may be mounted on a common reflector 734 that is similar to the reflector 634 discussed above.

Figure 9:
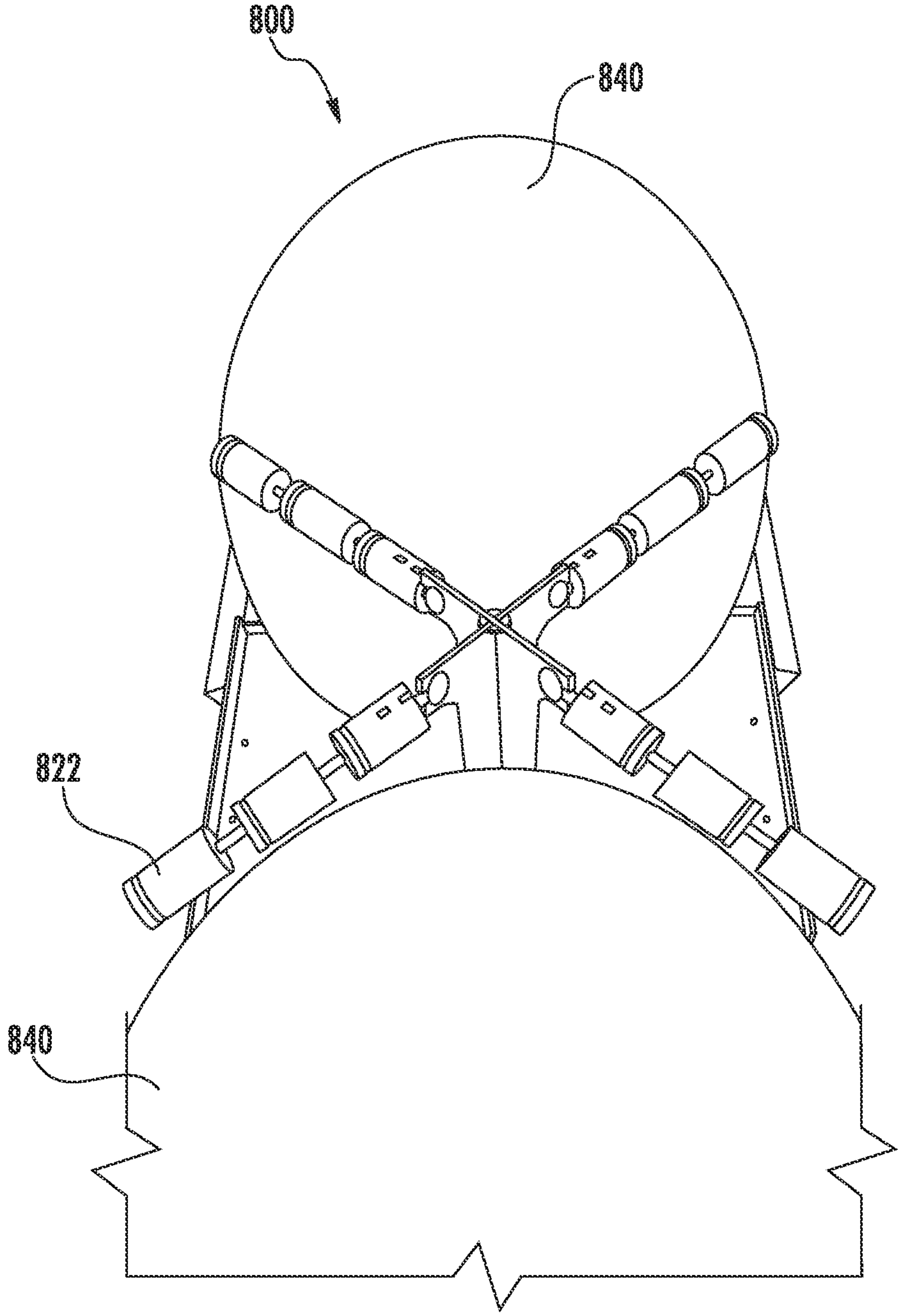
FIG. 9 is a partial perspective view of the lensed multi-beam antenna according to still further embodiments of the present invention that includes cross-dipole low-band radiating elements.

FIG. 9 is a partial perspective view of a lensed dual-band multi-beam antenna 800 according to further embodiments of the present invention. The antenna 800 may be similar to the antennas 600 and 700 that are discussed above, except that (1) the low-band array 820 that is included in the antenna 800 comprises a column of cross-dipole low-band radiating elements 822 as opposed to the tri-pole based radiating elements 622, 722 included in the antennas 600, 700 and (2) the low-band array extends along a central longitudinal axis of the antenna 800. It should be noted that FIG. 9 is only a partial view of the antenna 800 that shows one of the low-band cross-dipole radiating elements 822 and two of the spherical RF lenses 840. It will be appreciated that additional low-band radiating elements 822 and spherical RF lenses 840 would be included to repeat the structure shown in FIG. 9 multiple times along the vertical direction. In some embodiments, the low-band cross-dipole radiating elements 822 may have the design disclosed in U.S. Patent Publication No. 2015/0214617 where the dipoles are formed as a series of dipole segments and RF chokes. The RF chokes may reduce induced currents from the high-band signals in the low-band radiating elements 822. The cross-dipole radiating elements 822 may have a half-power azimuth beam width of, for example, about 60-65 degrees. Thus, three base station antennas 800 may provide full 360 degree coverage for the low-band. Other than the use of low-band cross-dipole radiating element 822, the antenna 800 may be identical to the antenna 700 discussed above and hence further description of the antenna 800 will be omitted.

Figure 10A:
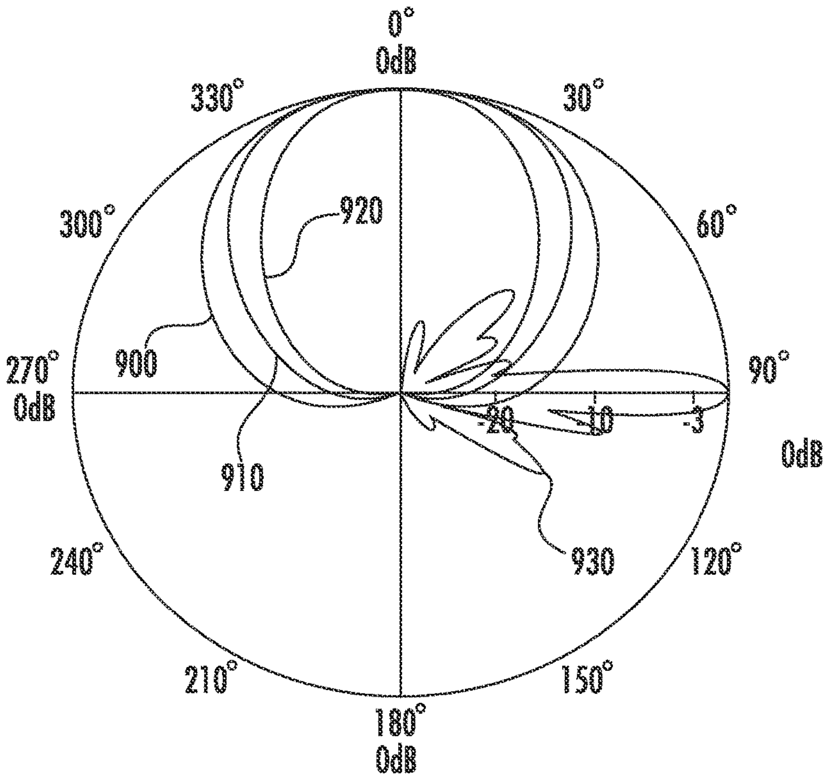
FIG. 10A is a graph illustrating the low-band radiation patterns for the antennas of FIGS. 7A-7E, 8A-8B and 9.

FIG. 10A is a graph illustrating the low-band radiation patterns for the antennas 600, 700, 800 of FIGS. 7A-7E, 8A-8B and 9. As shown in FIG. 10A, each of the antennas 600, 700, 800 may be designed to have substantially the same elevation pattern 930. The elevation pattern 930 has greater suppression for the upper sidelobes as compared to the lower sidelobes, as is typical for base station antennas. Curves 900, 910 and 920 illustrate the azimuth beam patterns for the respective antennas 600, 700, 800. As can be seen from FIG. 10A, the azimuth patterns are similar in respects except for beamwidth, with the antenna 600 having the smallest azimuth beam width and the antenna 800 having the largest azimuth beam width.

Figure 10B:
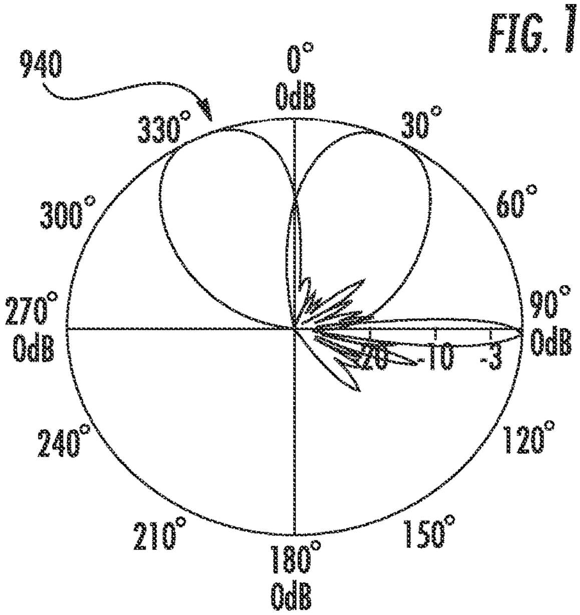
FIG. 10B is a graph illustrating the high-band radiation patterns for the antennas of FIGS. 7A-7E, 8A-8B and 9 when the antennas have two high-band arrays.
Figure 10C:
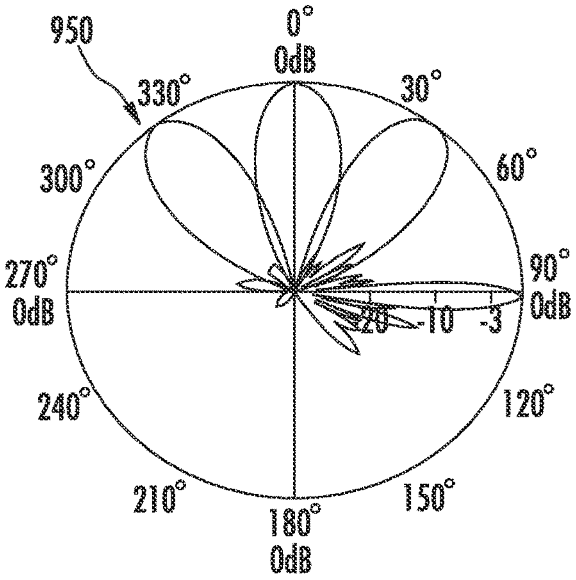
FIG. 10C is a graph illustrating the high-band radiation patterns for the antennas of FIGS. 7A-7E, 8A-8B and 9 when the antennas have three high-band arrays.

FIGS. 10B and 10C are graphs illustrating the high-band radiation patterns for the antennas 600, 700, 800 of FIGS. 7A-7E, 8A-8B and 9 when the antennas have two high-band arrays (FIG. 10B) versus three high band arrays (FIG. 10C). As shown in these figures, in each case the combination of the two or three high-band antenna beams may provide a half-power azimuth beam width of about 50-60 degrees.

It will be appreciated that numerous modifications may be made to the dual-band multi-beam antennas disclosed herein without departing from the scope of the present invention. For example, while various of the antennas disclosed herein use spherical RF lenses, it will be understood that elliptical or other RF lens could be used instead in other embodiments. It will likewise be appreciated that the numbers of radiating elements may be varied from what is shown, as may the number of low-band and/or high-band radiating elements per RF lens.

As another example, while each of the example embodiments described above includes a single low-band array, it will be appreciated that two or more low-band arrays may be included in other embodiments. The number of high-band arrays may likewise be varied.

As another example, the low-band radiating elements in the antennas described above may be designed so that the RF lenses will have at most limited effect on the low-band signals. In other embodiments, wider beamwidth low-band radiating elements such as patch radiating elements or dielectric loaded patch radiating elements may be used and the RF lens may be used to narrow the beam widths of bot the low-band and high-band radiating elements. For example, the low-band radiating elements may be designed to have an azimuth beamwidth of about 90 degrees, and the RF lens may be used to shrink the beamwidth to about 65 degrees.

While AMC materials may be used in some embodiments to position the low-band radiating elements closer to an underlying ground plane/reflector, it will be appreciated that in other embodiments a dielectric material may be used in place of the AMC material. The wavelength of the RF energy changes in the dielectric material (effectively becoming smaller), which allows the low-band radiating elements to be positioned closer to the reflector/ground plane.

The base station antennas according to embodiments of the present invention that are discussed above use RF lenses to focus the RF energy that radiates from, and is received by, at least some of the linear arrays to reduce the beamwidth of the antenna beams formed by those linear arrays. These RF lens may be formed using composite dielectric materials in some embodiments.

In some embodiments, the composite dielectric material that is included in the RF lenses disclosed herein may be a composite dielectric material 1000 that is formed using expandable dielectric microspheres 1010 (or other shaped expandable materials) that are mixed with conductive materials 1020 (e.g., conductive sheet material) that have an insulating material on each major surface. This composite dielectric material 1000 may further include a binder such as, for example, an inert oil. The small pieces of conductive sheet material 1020 having an insulating material on each major surface may comprise, for example, flitter or glitter. Flitter may comprise, for example, a thin sheet of metal (e.g., 6-50 microns thick) that has a thin insulative coating (e.g., 0.5-15 microns) on one or both sides thereof that is cut into small pieces (e.g., small 200-800 micron squares or other shapes having a similar major surface area). Glitter may be similar to flitter, but each piece of glitter may have a thicker insulating layer on one side of the metal sheet and a thinner insulative coating on the other side.

Figure 11:
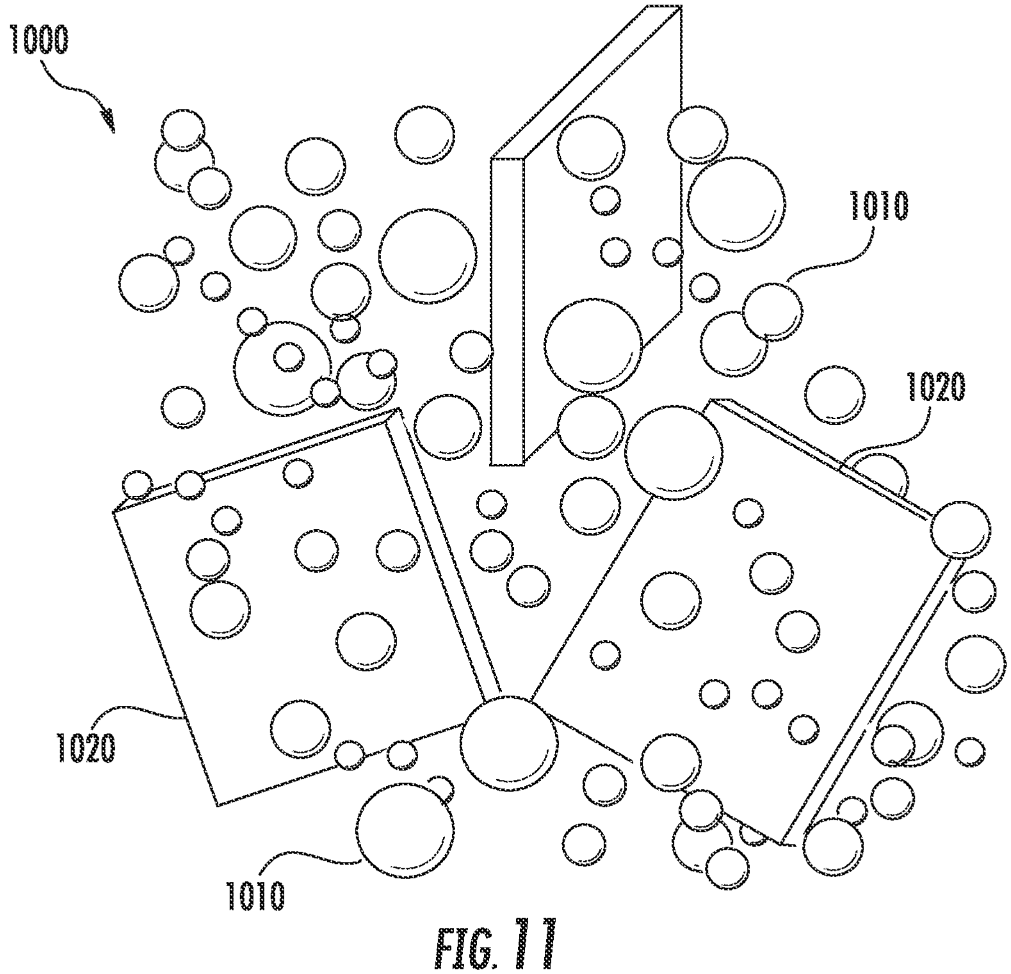
FIG. 11 is a schematic perspective view of a composite dielectric material that may be used to form the RF lenses included in the antennas according to embodiments of the present invention.

FIG. 11 is a schematic perspective view of an embodiment of the above-described composite dielectric material 1000 that includes expandable microspheres 1010 and flitter flakes 1020 that are mixed with a binder (not shown). The expandable microspheres 1010 may comprise very small (e.g., 1-10 microns in diameter) spheres that expand in response to a catalyst (e.g., heat) to larger (e.g., 12-100 micron diameter) air-filled spheres. These expanded microspheres 1010 may have very small wall thickness and hence may be very lightweight. The flitter flakes 1020 may be formed, for example, by coating each side of a thin (e.g., 18 micron) aluminium or copper sheet with a very thin insulative coating (e.g., 2 microns thick), and then cutting the composite sheet into, for example, 375×375 micron flakes. Other sized flitter flakes 1020 may be used (e.g., sides of the flake may be in the range from 100 microns to 1000 microns, and the flitter flakes 1020 need not be square). Flitter flakes 1020 may also be used that are formed from thinner metal sheets and/or that have thicker insulating coatings. For example, in another embodiment, the flitter flakes 1020 may be cut from a sheet of base material that has a 6-micron thick sheet of aluminum foil with 6-micron thick polyethylene sheets adhered to either side thereof.

The mixture of the microspheres 1010, flitter flakes 1020 and the binder may, after heating, comprise, for example, a lightweight, semi-solid, semi-liquid material in the form of a flowable paste that may have a consistency similar to, for example, warm butter. The material may be pumped into a shell to form an RF lens for a base station antenna. The composite dielectric material 1000 focuses the RF energy that radiates from, and is received by, the linear arrays.

As shown in FIG. 11, the expanded microspheres 1010 along with the binder may form a matrix that holds the flitter flakes 1020 in place to form the composite dielectric material. The expanded microspheres 1010 may tend to separate adjacent flitter flakes 1020 so that sides of the flitter flakes 1020, which may have exposed metal, will be less likely to touch the sides of other flitter flakes 1020, since such metal-to-metal contacts may be a source of passive intermodulation ("PIM") distortion. If copper is used to form the flitter flakes 1020, the flitter flakes 1020 may be heated so that the exposed edges of the copper oxidizes into a non-conductive material which may reduce or prevent any flitter flakes 1020 that come into contact with each other from becoming electrically connected to each other, which may further improve PIM distortion performance.

While not shown in FIG. 11, other dielectric materials such as foamed polystyrene microspheres or other shaped foamed particles may also be added to the mixture. These additional dielectric materials may be larger than the expanded microspheres 1010 in some embodiments (e.g., having diameters of between 0.5 and 3 mm). In some embodiments, the expanded microspheres 1010 may be significantly smaller than the flitter flakes 1020 (or other conductive materials). For example, an average surface area of the flitter flakes 1020 may exceed an average surface area of the expandable microspheres 1010 after expansion.

In other embodiments, the composite dielectric material may be of the type described in U.S. Pat. No. 8,518,537 ("the '537 patent"), the entire content of which is incorporated herein by reference. In one example embodiment, small blocks of the composite dielectric material are provided, each of which includes at least one needle-like conductive fiber embedded therein. The small blocks may be formed into a much larger structure using an adhesive that glues the blocks together. The blocks may have a random orientation within the larger structure. The composite dielectric material used to form the blocks may be a lightweight material having a density in the range of, for example. 0.005 to 0.1 g/cm3. By varying the number and/or orientation of the conductive fiber(s) that are included inside the small blocks, the dielectric constant of the material can be varied from 1 to 3.

Figure 12A:
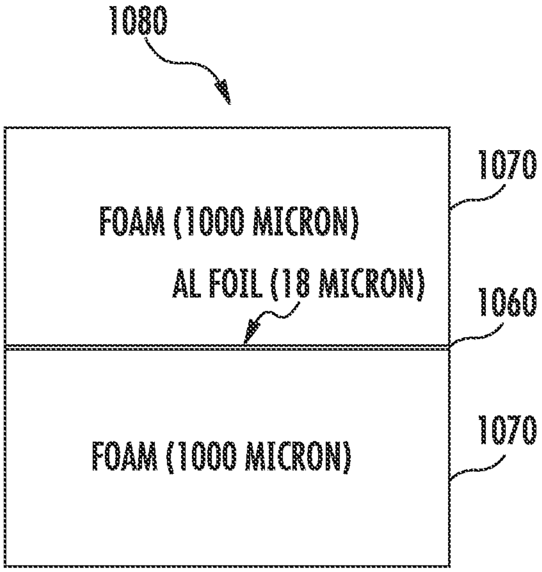
FIG. 12A is a cross-sectional view of one block of another composite dielectric material that may be used to form the RF lenses included in the antennas according to embodiments of the present invention.
Figure 12B:
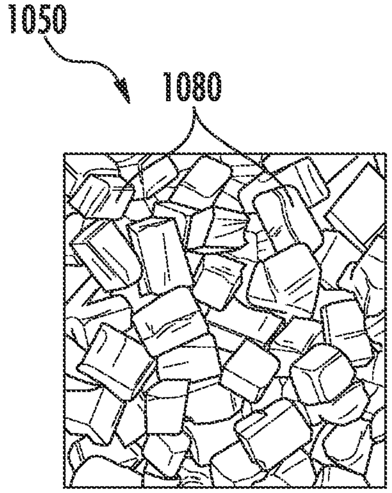
FIG. 12B is a schematic perspective view of a plurality of the blocks of composite dielectric material of FIG. 12A filled into a container to form an RF lens.

In still other embodiments, the RF lenses disclosed herein may be formed using any of the dielectric materials disclosed in U.S. Provisional Patent Application Ser. No. 62/313,406 ("the '406 application"), filed Mar. 25, 2016, the entire content of which is incorporated herein by reference. One of the composite dielectric materials of the '406 application is depicted in FIGS. 12A and 12B of the present application. In particular. FIG. 12A is a cross-sectional view of one block 1080 of a composite dielectric material 1050, while FIG. 12B is a schematic perspective view of a plurality of the blocks 1080 the of composite dielectric material 1050 filled into a container (not shown) to form an RF lens.

As shown in FIGS. 12A-12B, the composite dielectric material 1050 may be formed by adhering a thin sheet of conductive material 1060 (e.g., 5-40 microns thick) between two thicker sheets 1070 of foamed material (e.g., 500-1500 micron thick sheets of foamed material). In the specific example shown in FIG. 12A, the conductive sheet 1060 is an 18 micron thick aluminium sheet, and the foam sheets 1070 may be polyethylene dielectric foam sheets 1070 that are each about 1000 microns thick. A thin layer of adhesive is sprayed or otherwise deposited on each surface of the metal sheet 1060 to adhere the three layers together into a composite sheet of artificial dielectric material. This composite foam/foil sheet material is cut into small blocks 1080 that are, for example, between 1-4 mm per side and used to fill a shell to form an RF lens for an antenna. The foam sheets 1070 may comprise a highly foamed, lightweight, low dielectric constant material. The blocks 1080 of material formed in this manner may be held together using a low dielectric loss binder or adhesive or may simply be filled into a container to form the lens. The blocks 1080 may be heated prior to forming the lens in order to oxidize any exposed metal.

As is also disclosed in the '406 application, in other embodiments the RF lens may be a shell filled with a composite dielectric material that comprises a mixture of a high dielectric constant material and a lightweight, low dielectric constant base dielectric material. For example, the composite dielectric material may comprise a large block of foamed base dielectric material that includes particles (e.g., a powder) of a high dielectric constant material embedded therein. The lightweight, low dielectric constant base dielectric material may comprise, for example, a foamed plastic material such as polyethylene, polystyrene, polytetrafluoroethylene (PTEF), polypropylene, polyurethane silicon or the like that has a plurality of particles of a high dielectric constant material embedded therein. In some embodiments, the foamed lightweight low dielectric constant base dielectric material may have a foaming percentage of at least 50%. The high dielectric constant material may comprise, for example, small particles of a non-conductive material such as, for example, a ceramic (e.g., $Mg_2TiO_4$, $MgTiO_3$, $CaTiO_3$, $BaTi_4O_9$, boron nitride or the like) or a non-conductive (or low conductivity) metal oxide (e.g., titanium oxide, aluminium oxide or the like). In some embodiments, the high dielectric constant material may have a dielectric constant of at least 10. The particles of high dielectric constant material may be generally uniformly distributed throughout the base dielectric material and may be randomly oriented within the base dielectric material. In some embodiments, the composite dielectric material may comprise a plurality of small blocks of a base dielectric material, where each block has particles of a high dielectric constant dielectric material embedded therein and/or thereon.

In other embodiments, the RF lenses may be formed of a reticular foamed material that has conductive particles and/or particles of a high dielectric constant material embedded throughout the interior of the foamed material. In such embodiments, a plurality of small blocks of this material may be formed or the lens may comprise a single block of this material that may be shaped into the desired shape for the lens (e.g., a spherical shape, a cylindrical shape, etc.). The foamed material may have a very open cell structure to reduce the weight thereof, and the conductive and/or high dielectric constant particles may be bound within the matrix formed by the foam using a binder material. Suitable high dielectric constant particles include particles of lightweight conductors, ceramic materials, conductive oxides and/or carbon black. In embodiments that use small blocks of this material, the blocks may be held together using a low dielectric loss binder or adhesive or may be simply be filled into a container to form the lens.

In yet other embodiments, the RF lenses may be formed using one or more thin wires that are coated with an insulating material and loosely crushed into a block-like shape. As the wires are rigid, they may be used to form a dielectric material without the need for a separate material such as a foam. In some embodiments, the crushed wire(s) may be formed into the shape of a lens. In other embodiments, a plurality of blocks of crushed wire(s) may be combined to form the lens. In yet additional embodiments, the RF lenses may be formed using thin sheets of dielectric material that is either crumpled or shredded and placed in a container having the desired shape for the lens. As with the insulated wire embodiment discussed above, the crumbled/shredded sheets of dielectric material may exhibit rigidity and hence may be held in place without an additional matrix material.

In some embodiments, the dielectric constant of the lens material may remain relatively constant throughout the RF lens. In other embodiments, the dielectric constant may vary. For example, in some embodiments where the dielectric constant varies, the RF lenses may comprise Luneburg lenses, which are multi-layer lenses, typically spherical in shape, that have dielectric materials having different dielectric constants in each layer.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna, comprising:

a reflector;

a first vertically-extending column of low-band radiating elements mounted in front of the reflector that are configured to form a first antenna beam; and a second vertically-extending column of high-band radiating elements mounted in front of the reflector that are configured to form a second antenna beam, wherein a meta-material surface is disposed behind a radiator of a first of the low-band radiating elements, and wherein the meta-material surface comprises a dielectric substrate and periodical patches on the dielectric substrate.

2. The base station antenna of claim 1, wherein the radiator of the at least one low-band radiating element is mounted less than one-quarter of a wavelength from the reflector, where the wavelength is the wavelength corresponding to a center frequency of an operating frequency band of the low-band radiating elements.

3. The base station antenna of claim 2, where a periodicity of the patches is smaller than a wavelength corresponding to a center frequency of an operating frequency band of the low-band radiating elements.

4. The base station antenna of claim 1, wherein the meta-material surface is disposed between the radiator and the reflector.

5. The base station antenna of claim 1, wherein the plurality of patches comprise periodical patches.

6. The base station antenna of claim 5, wherein a periodicity of the patches is smaller than a wavelength corresponding to a center frequency of an operating frequency band of the low-band radiating elements.

7. The base station antenna of claim 1, further comprising a radio frequency ("RF") lens, where the first of the low-band radiating elements is positioned between the RF lens and the reflector.

8. The base station antenna of claim 1, wherein the low-band radiating elements are cross-polarized radiating elements that each include a pair of dipole radiators.

9. The base station antenna of claim 1, wherein a stalk of the first of the low-band radiating elements extends through the meta-material surface.

* * * * *